US012592903B2

(12) United States Patent
Derzsy et al.

(10) Patent No.: US 12,592,903 B2
(45) Date of Patent: Mar. 31, 2026

(54) NOTIFICATION DELIVERY SERVICE

(71) Applicant: AT&T Intellectual Property I, L.P., Atlanta, GA (US)

(72) Inventors: Noemi Derzsy, Jersey City, NJ (US); Elena Khusainova, New Haven, CT (US); Eric Zavesky, Austin, TX (US); Emily Dodwell, Metuchen, NJ (US)

(73) Assignee: AT&T Intellectual Property I. L.P., Atlanta, GA (US)

( * ) Notice: Subject to any disclaimer, the term of this patent is extended or adjusted under 35 U.S.C. 154(b) by 0 days.

(21) Appl. No.: 18/770,058

(22) Filed: Jul. 11, 2024

(65) Prior Publication Data

US 2026/0019395 A1    Jan. 15, 2026

(51) Int. Cl.
*G06F 15/16*      (2006.01)
*H04L 51/216*      (2022.01)
*H04L 51/224*      (2022.01)

(52) U.S. Cl.
CPC .......... *H04L 51/224* (2022.05); *H04L 51/216* (2022.05)

(58) Field of Classification Search
CPC ............................ H04L 51/224; H04L 51/216
USPC .......................................................... 709/206
See application file for complete search history.

(56) References Cited

U.S. PATENT DOCUMENTS

| | | | | |
|---|---|---|---|---|
| 8,352,546 B1 * | 1/2013 | Dollard | ................. | H04W 4/029 |
| | | | | 709/217 |
| 8,576,828 B1 * | 11/2013 | Massey, Jr. | ........... | H04M 3/436 |
| | | | | 455/420 |
| 8,707,201 B1 * | 4/2014 | Aradhye | ........... | G06F 16/24578 |
| | | | | 715/204 |
| 8,751,500 B2 * | 6/2014 | Duarte | .................. | G06Q 10/10 |
| | | | | 707/737 |
| 8,761,737 B2 * | 6/2014 | Clarke | ................. | H04L 51/234 |
| | | | | 709/227 |
| 8,819,277 B2 * | 8/2014 | Glowacki | ............... | H04L 67/55 |
| | | | | 709/240 |
| 8,949,363 B2 * | 2/2015 | Gray | ................... | H04L 12/1895 |
| | | | | 709/224 |
| 9,273,978 B2 * | 3/2016 | Walker | .............. | G01C 21/3629 |
| 9,277,530 B2 * | 3/2016 | Korver | ............. | H04W 52/0209 |
| 9,288,164 B2 * | 3/2016 | Vyrros | ................. | H04W 12/02 |
| 9,306,888 B2 * | 4/2016 | Kao | ....................... | H04L 51/52 |
| 9,338,761 B2 * | 5/2016 | Ur | ....................... | H04W 68/005 |

(Continued)

*Primary Examiner* — Alicia Baturay
(74) *Attorney, Agent, or Firm* — Hartman & Citrin LLC

(57) ABSTRACT

A notification delivery service can manage notification delivery for a user device by receiving, from a user device, a notification request that requests delivery of a notification; retrieving a notification model for the user device, the notification model including a ruleset and a framework for delivering notifications to the user device. The notification model can include or reflect preferences and a notification history associated with the user device. The notification delivery service can obtain contextual data defining a location and activity of the user device and an ambient sound level measured at the user device. The notification delivery service can determine, based on the notification model, the notification request, and the contextual data, a recipient to which the notification is to be delivered and a time at which the notification is to be delivered to the recipient. The notification delivery service can trigger delivery of the notification to the recipient.

20 Claims, 10 Drawing Sheets

(56) References Cited

U.S. PATENT DOCUMENTS

| | | | | |
|---|---|---|---|---|
| 9,363,214 | B2 * | 6/2016 | Krishna | G06F 16/41 |
| 9,462,570 | B1 * | 10/2016 | Bostick | H04W 68/005 |
| 9,505,412 | B2 * | 11/2016 | Bai | B60W 40/08 |
| 9,531,651 | B1 * | 12/2016 | Cherubini | H04L 51/224 |
| 9,560,001 | B1 * | 1/2017 | Collins | H04L 51/52 |
| 9,729,489 | B2 * | 8/2017 | Appelman | G06Q 10/10 |
| 9,817,869 | B2 * | 11/2017 | Aradhye | H04L 51/226 |
| 9,948,592 | B1 * | 4/2018 | Collins | H04L 51/52 |
| 9,979,680 | B2 * | 5/2018 | Chen | G06Q 10/10 |
| 10,149,278 | B2 * | 12/2018 | Borges | H04W 48/16 |
| 10,261,749 | B1 * | 4/2019 | Wilcox | G06F 3/04845 |
| 10,270,728 | B1 * | 4/2019 | Collins | H04L 51/42 |
| 10,305,835 | B2 * | 5/2019 | James | H04L 67/75 |
| 10,321,195 | B1 * | 6/2019 | Nasir | H04N 21/4668 |
| 10,382,829 | B1 * | 8/2019 | Panchaksharaiah | H04N 21/252 |
| 10,406,287 | B2 * | 9/2019 | Davis | G16H 50/20 |
| 10,419,381 | B2 * | 9/2019 | Burdakov | H04L 67/306 |
| 10,469,429 | B2 * | 11/2019 | Hardee | H04L 51/214 |
| 10,491,962 | B2 * | 11/2019 | Siddiq | G06F 9/542 |
| 10,567,483 | B2 * | 2/2020 | Ruetschi | H04L 65/1104 |
| 10,601,940 | B2 * | 3/2020 | Onnen | H04L 67/52 |
| 10,638,279 | B2 * | 4/2020 | Ryder | G06N 20/00 |
| 10,659,411 | B2 * | 5/2020 | Lewis | H04L 67/75 |
| 10,659,418 | B1 * | 5/2020 | Collins | H04L 51/52 |
| 10,728,201 | B2 * | 7/2020 | Ratiu | H04L 67/535 |
| 10,802,681 | B2 * | 10/2020 | Firstenberg | G06F 3/0484 |
| 10,831,569 | B1 * | 11/2020 | Thallapragada | G06F 9/542 |
| 10,841,896 | B2 * | 11/2020 | DeLuca | H04W 4/023 |
| 10,904,379 | B2 * | 1/2021 | Ko | H04M 1/72457 |
| 11,122,377 | B1 * | 9/2021 | Dickmann | H04R 25/70 |
| 11,262,902 | B2 * | 3/2022 | Crowley | G08B 21/24 |
| 11,321,673 | B2 * | 5/2022 | Sun | G06Q 10/1093 |
| 11,388,021 | B2 * | 7/2022 | Restrepo Conde | H04L 51/214 |
| 11,489,804 | B2 * | 11/2022 | Vardhan | H04L 67/306 |
| 11,729,124 | B2 * | 8/2023 | Bar-On | H04L 51/42 |
| | | | | 709/206 |
| 2015/0350146 | A1 * | 12/2015 | Cary | H04L 51/046 |
| | | | | 709/206 |
| 2017/0017351 | A1 * | 1/2017 | Singh | G06F 3/14 |
| 2017/0289087 | A1 * | 10/2017 | Chang | H04L 51/224 |
| 2017/0291543 | A1 * | 10/2017 | Goldman-Shenhar | B60Q 9/00 |
| 2021/0351977 | A1 * | 11/2021 | T.V. | H04L 41/0803 |
| 2025/0211941 | A1 * | 6/2025 | Fischer | H04W 4/024 |

* cited by examiner

200

START

202
DEVICE REGISTRATION WITH
NOTIFICATION DELIVERY SERVICE

204
OBTAIN MODEL DATA
FROM THE DEVICES

206
IDENTIFY NOTIFICATION
HISTORIES, DEVICE LISTS, AND
PREFERENCES

208
CREATE & STORE
A NOTIFICATION MODEL

210
END

400

START

402
DETECT REQUEST TO IDENTIFY
NOTIFICATION DEVICES

404
POLL LOCAL NETWORK AND VICINITY
FOR NOTIFICATION DEVICES

406
GENERATE A LIST OF NOTIFICATION
DEVICES

408
OBTAIN SELECTIONS OF
NOTIFICATIONS DEVICE

410
PROVIDE NOTIFICATION
PREFERENCES TO THE SERVICE

412
END

NOTIFICATION DELIVERY SERVICE

BACKGROUND

With the proliferation of Internet-connected devices, users of these devices may receive frequent notifications relating to various services or events such as, for example, credit card charge notifications, text messages, email messages, health application alerts or notifications, navigation application notifications or alerts, connected-home and/or Internet-of-things device notifications, and/or other device or service notifications from a plethora of devices, services, and/or representing a plethora of events. The sheer volume of these notifications can overwhelm users, and because these notifications may be generated at almost any time, users may miss important notifications for any number of reasons.

Furthermore, the mode of delivery used for notifications can be set at a device or service level in various cases, but given the diverse notifications received by some users, tailoring notifications at a device and/or service level may be insufficient to enable a user to distinguish notifications from each other and/or other users in a convenient manner.

SUMMARY

The present disclosure is directed to a notification delivery service. A user device can register and/or authenticate with the notification delivery service for management of notifications for the user device and/or other devices. The user device can authenticate with and/or access the notification delivery service using a notification delivery application or other applications that may access the notification delivery service via one or more portals, webpages, application programming interfaces ("APIs"), or the like. The user device and/or other various other devices can collect and provide, to the notification delivery service, model data that can include contextual information associated with the user device and the receipt, thereof, of one or more notifications. The notification delivery service can analyze the model data and generate, based on the model data, a notification model for the user device. The notification model can model delivery of notifications to the user device and behavior of the user device in response to the notifications. In various embodiments, the notification model can include a rule set and/or a framework for optimizing the creation of and delivery of notifications to the user device. The notification delivery service can store the notification model and can update the notification model based on future releases of model data, notification requests, and/or contextual data.

The notification delivery service can receive a notification request that can request a notification for delivery to the user device. The notification request also can include a device list of notification devices to which notifications can be sent (instead of or in addition to the user device). The notification also can include preferences for notifications such as, for example, sounds, visual effects, haptic outputs, and the like for notifications, timing of delivery of notifications, location preferences (e.g., locations at which notifications should and/or should not be provided, etc.), and the like. In some other embodiments, the user device can communicate the preferences to the notification delivery service at other times such as during a setup and/or registration process (e.g., for the user device, for the user, or the like). Regardless of how and/or when created, the preferences can be stored as part of the notification model, in some embodiments. Based on the notification request and the notification model, the notification delivery service can determine notifications that may be generated for the user device. In some embodiments, the notification delivery service also can obtain, from the user device and/or the other devices, contextual data for potential use in modifying the notifications.

In particular, the contextual data can include location data, sound level data, activity data, and other data associated with the user device. The location data can define a geographic location of the user device and/or proximity of the user device to other devices such as the notification devices. The sound level data can define ambient sound levels at the user device, frequencies of noise at the user device, and/or other sound information that may affect the ability of a user to hear the notifications if provided audibly. The activity data also can define activity of the user device and/or a user associated with the user device. Thus, the contextual data can define a state and location of the user device.

Based on the contextual data and the notification model, the notification delivery service can determine if any of the notifications should be modified in terms of mode of delivery (e.g., audible, visual, haptic, etc.), time of delivery (e.g., immediately, delayed, repeated, replicated, etc.), recipients of the notifications (e.g., the user device and/or one or more notification devices), and the like. In another embodiment, one modification may be the summarization of and/or grouping of multiple notifications (e.g., several motion and sound sensors responding to a robotic vacuum may be grouped together or summarized) and/or the plausible explanation of one or more notifications (e.g., explaining that a high-pitched sound in a kitchen may be a smoke or fire alarm, a warning signal about sitting food in a microwave, or a defective condenser unit in a refrigerator, etc.). It should be understood that these example embodiments are illustrative, and therefore should not be construed as being limiting in any way.

If no modifications to the notifications are to be made, the notifications may be delivered without changes. If changes are to be made, the notification delivery service can modify the notifications and/or the delivery thereof and deliver (or trigger delivery of) the notifications, summary of notifications, group of notifications, and/or the like, to the user device and/or one or more notification devices. The notification delivery service also can update the notification models based on the notification delivery. Thus, the notification delivery service can maximize the effectiveness of notifications intended for the user device, according to some embodiments. It should be understood that this example embodiment is illustrative, and therefore should not be construed as being limiting in any way.

In various embodiments of the concepts and technologies disclosed herein, the notifications that are provided to the user device can be provided by devices in the local environment such as Internet-of-things devices, speakers, other computers, displays, or the like. In some such embodiments, the Internet-of-things devices or the like can be connected to the notification delivery service. Thus, notifications can be provided by the Internet-of-things devices or the like via tunneled connections with the server computer or other functionality, and the notification delivery service can send those notifications to the user device and/or one or more notification devices. Because notifications can be sent to and/or through the notification delivery service in embodiments of the concepts and technologies disclosed herein, notifications can be standardized by the notification delivery service according to preferences of a user and delivered in a unified and/or consistent manner using the preferences of the user, settings, configurations, one or more histories (of notifications and/or activity), contextual information, and/or other tailored considerations (e.g., frequency of sounds, use of visual output, use of haptic output, and the like), even if the device generating the notifications does not support such features. It should be understood that this example embodiment is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include receiving, by a notification delivery service and from a user device, a notification request that requests delivery of a notification; and retrieving, by the notification delivery service, a notification model for the user device. The notification model can include a ruleset and framework for delivering notifications to the user device, and the notification model can include preferences associated with the user device and a notification history associated with the user device. The operations further can include obtaining, by the notification delivery service and from the user device, contextual data defining a location of the user device, an activity of the user device, and an ambient sound level measured at the user device; determining, by the notification delivery service and based on the notification model, the notification request, and the contextual data, a recipient to which the notification is to be delivered and a time at which the notification is to be delivered to the recipient; and triggering, by the notification delivery service, delivery of the notification to the recipient.

In some embodiments, the recipient can include the user device and a notification device located at a local environment in which the user device is located. In some embodiments, the preferences can include a device list. The device list can identify notification devices to which the notifications can be provided for the user device, and the notification devices can include the notification device located at the local environment. In some embodiments, the device list can include the notification devices and can be obtained from the user device. The user device can create the device list at the user device by detecting, using a WiFi transceiver and a Bluetooth transceiver, the notification devices; presenting selectable representations of the notification devices in a user interface presented at the user device; and generating the device list including selected notification devices.

In some embodiments, the operations further can include detecting registration of the user device with the notification delivery service. Registration may include passive actions such as standard network operations like detection or scanning of an access point (WiFi, Bluetooth, etc.) where the state of the user device or the notification delivery service can be unchanged, as well as other operations. For example, registration can include authenticating with the notification delivery service and requesting management of the notifications for the user device by the notification delivery service. The operations further can include obtaining, from the user device, model data including the notification history associated with the user device, activity associated with the user device, and the preferences of the user device for the notifications that are intended for the user device; and creating the notification model and storing the notification model at a data storage location accessible by the notification delivery service. In some embodiments, the contextual data can be obtained from the user device and other devices, which can include a network monitor associated with a mobility network with which the user device communicates, and a location monitor that monitors locations of the user device. In some embodiments, determining the time at which the notification is to be delivered to the recipient can include determining, based on the ambient sound level at the user device, that the ambient sound level exceeds a defined sound level threshold and determining that delivery of the notification is to be delayed until the ambient sound level does not exceed the defined sound level threshold.

According to another aspect of the concepts and technologies disclosed herein, a method is disclosed. The method can include receiving, by a computer executing a notification delivery service and from a user device, a notification request that requests delivery of a notification; and retrieving, by the notification delivery service, a notification model for the user device, the notification model including a ruleset and framework for delivering notifications to the user device. The notification model can include preferences associated with the user device and a notification history associated with the user device. The method can also include obtaining, by the notification delivery service and from the user device, contextual data defining a location of the user device, an activity of the user device, and an ambient sound level measured at the user device; determining, by the notification delivery service and based on the notification model, the notification request, and the contextual data, a recipient to which the notification is to be delivered and a time at which the notification is to be delivered to the recipient; and triggering, by the notification delivery service, delivery of the notification to the recipient.

In some embodiments, the recipient can include the user device and a notification device located at a local environment in which the user device is located. In some embodiments, the preferences can include a device list. The device list can identify notification devices to which the notifications can be provided for the user device, and the notification devices can include the notification device located at the local environment. In some embodiments, the device list can include the notification devices and can be obtained from the user device. The user device can create the device list at the user device by detecting, using a WiFi transceiver and a Bluetooth transceiver, the notification devices; presenting selectable representations of the notification devices in a user interface presented at the user device; and generating the device list including selected notification devices.

In some embodiments, the operations further can include detecting registration of the user device with the notification delivery service. Registration can include authenticating with the notification delivery service and requesting management of the notifications for the user device by the notification delivery service. The operations further can include obtaining, from the user device, model data including the notification history associated with the user device, activity associated with the user device, and the preferences of the user device for the notifications that are intended for the user device; and creating the notification model and storing the notification model at a data storage location accessible by the notification delivery service. In some embodiments, the contextual data can be obtained from the user device and other devices, which can include a network monitor associated with a mobility network with which the user device communicates, and a location monitor that monitors locations of the user device. In some embodiments, determining the time at which the notification is to be delivered to the recipient can include determining, based on the ambient sound level at the user device, that the ambient sound level exceeds a defined sound level threshold and determining that delivery of the notification is to be delayed until the ambient sound level does not exceed the defined sound level threshold.

According to yet another aspect of the concepts and technologies disclosed herein, a computer storage medium is disclosed. The computer storage medium can store computer-executable instructions that, when executed by a processor, cause the processor to perform operations. The operations can include receiving, by a notification delivery service and from a user device, a notification request that requests delivery of a notification; and retrieving, by the notification delivery service, a notification model for the user device. The notification model can include a ruleset and framework for delivering notifications to the user device, and the notification model can include preferences associated with the user device and a notification history associated with the user device. The operations further can include obtaining, by the notification delivery service and from the user device, contextual data defining a location of the user device, an activity of the user device, and an ambient sound level measured at the user device; determining, by the notification delivery service and based on the notification model, the notification request, and the contextual data, a recipient to which the notification is to be delivered and a time at which the notification is to be delivered to the recipient; and triggering, by the notification delivery service, delivery of the notification to the recipient.

In some embodiments, the recipient can include the user device and a notification device located at a local environment in which the user device is located. In some embodiments, the preferences can include a device list. The device list can identify notification devices to which the notifications can be provided for the user device, and the notification devices can include the notification device located at the local environment. In some embodiments, the device list can include the notification devices and can be obtained from the user device. The user device can create the device list at the user device by detecting, using a WiFi transceiver and a Bluetooth transceiver, the notification devices; presenting selectable representations of the notification devices in a user interface presented at the user device; and generating the device list including selected notification devices.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

BRIEF DESCRIPTION OF THE DRAWINGS

FIG. 4 is a flow diagram showing aspects of a method for identifying and designating notification devices using a notification delivery service, according to an illustrative embodiment of the concepts and technologies described herein.

Figure 5A:
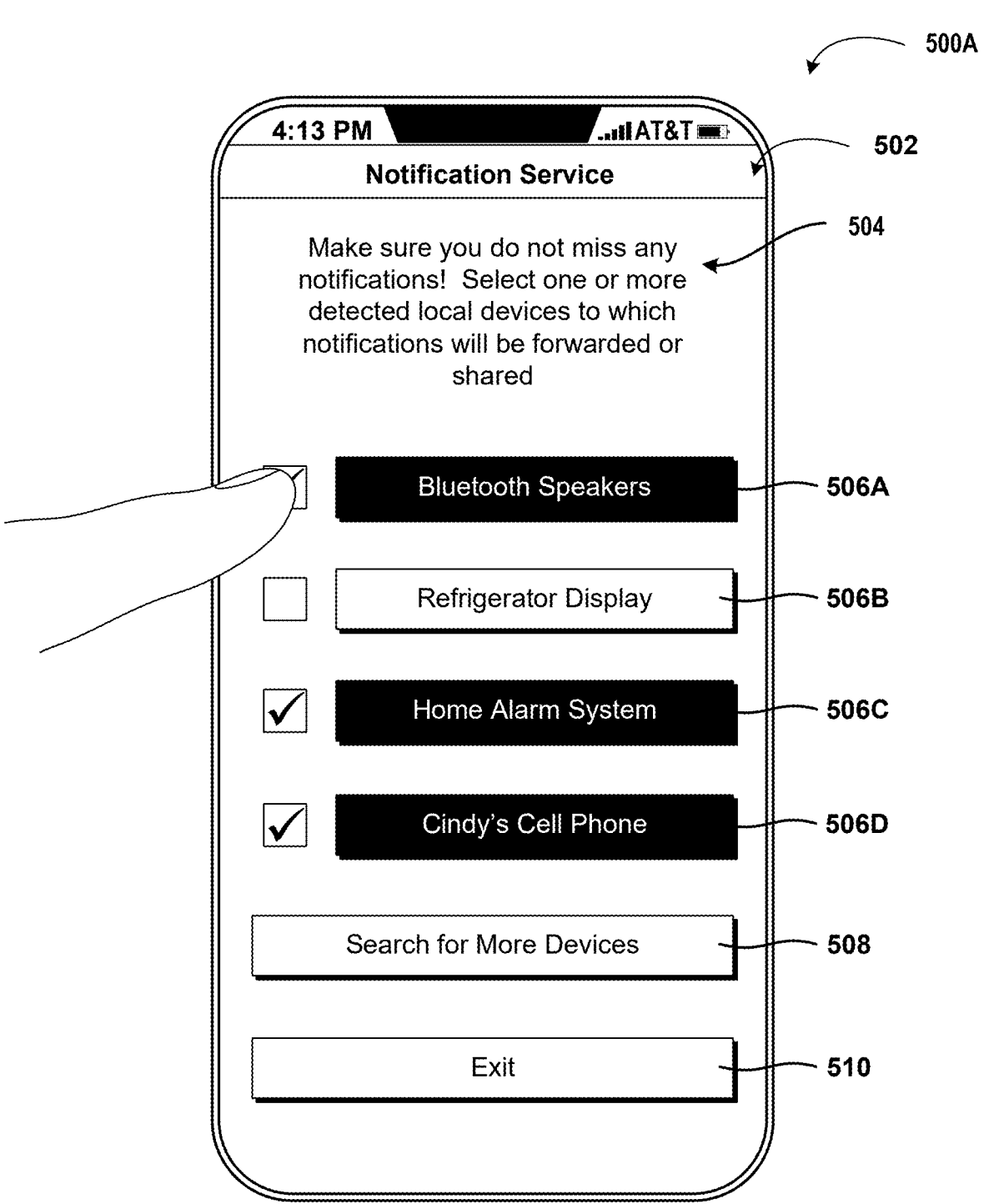
Figure 5B:
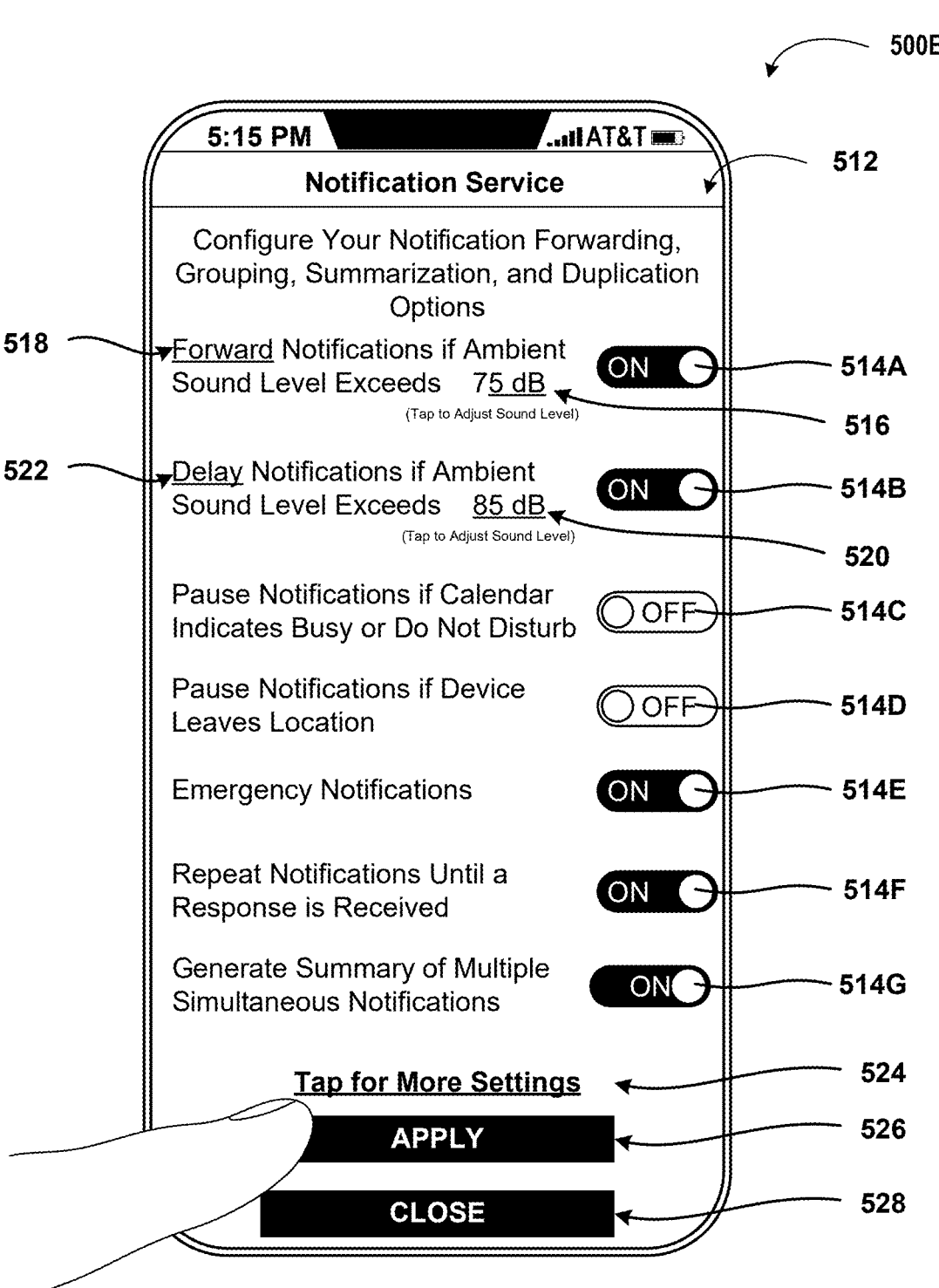

FIGS. 5A-5B are user interface diagrams showing various screen displays for using a notification delivery service, according to some illustrative embodiments of the concepts and technologies described herein.

Figure 6:
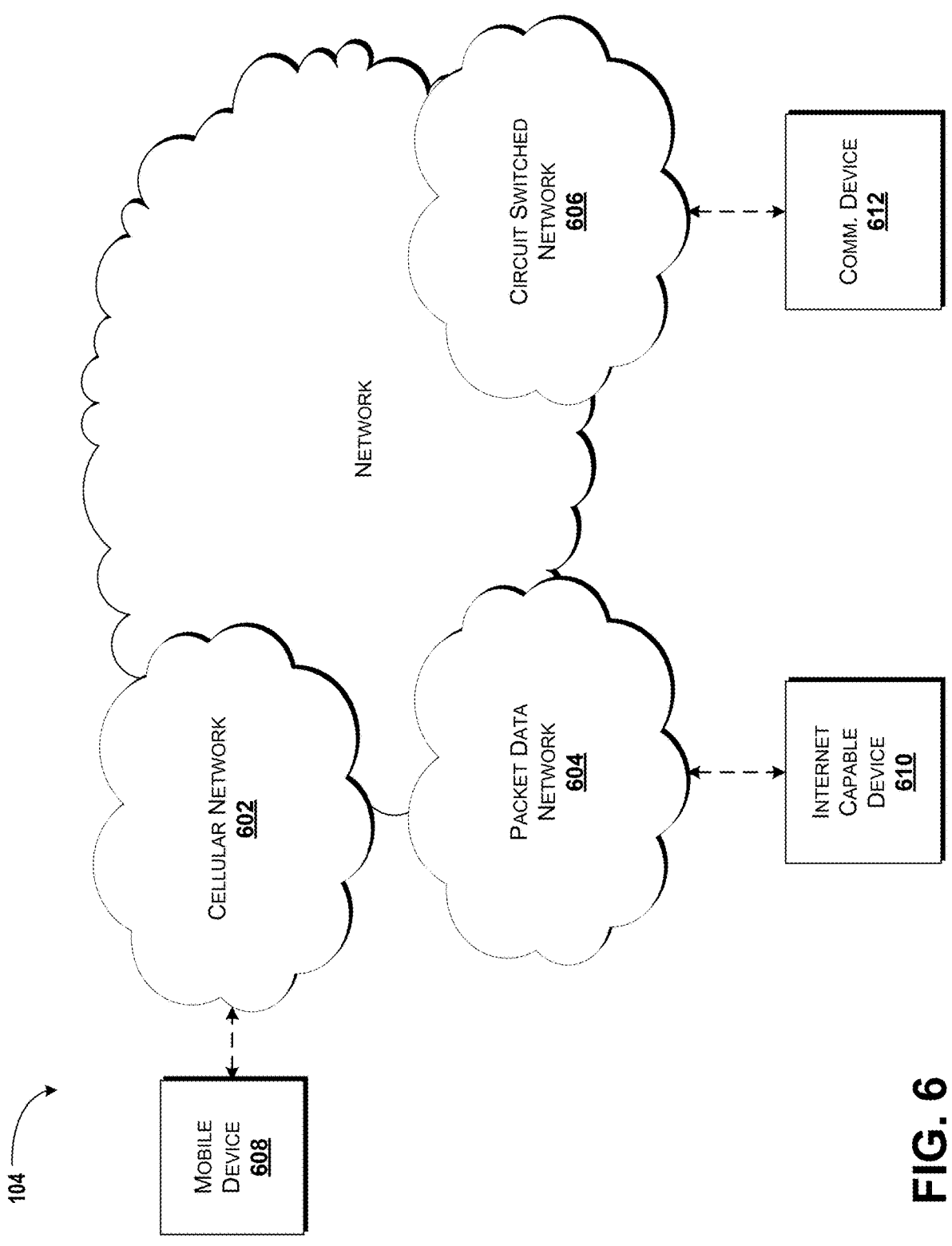

FIG. 6 schematically illustrates a network, according to an illustrative embodiment of the concepts and technologies described herein.

Figure 7:
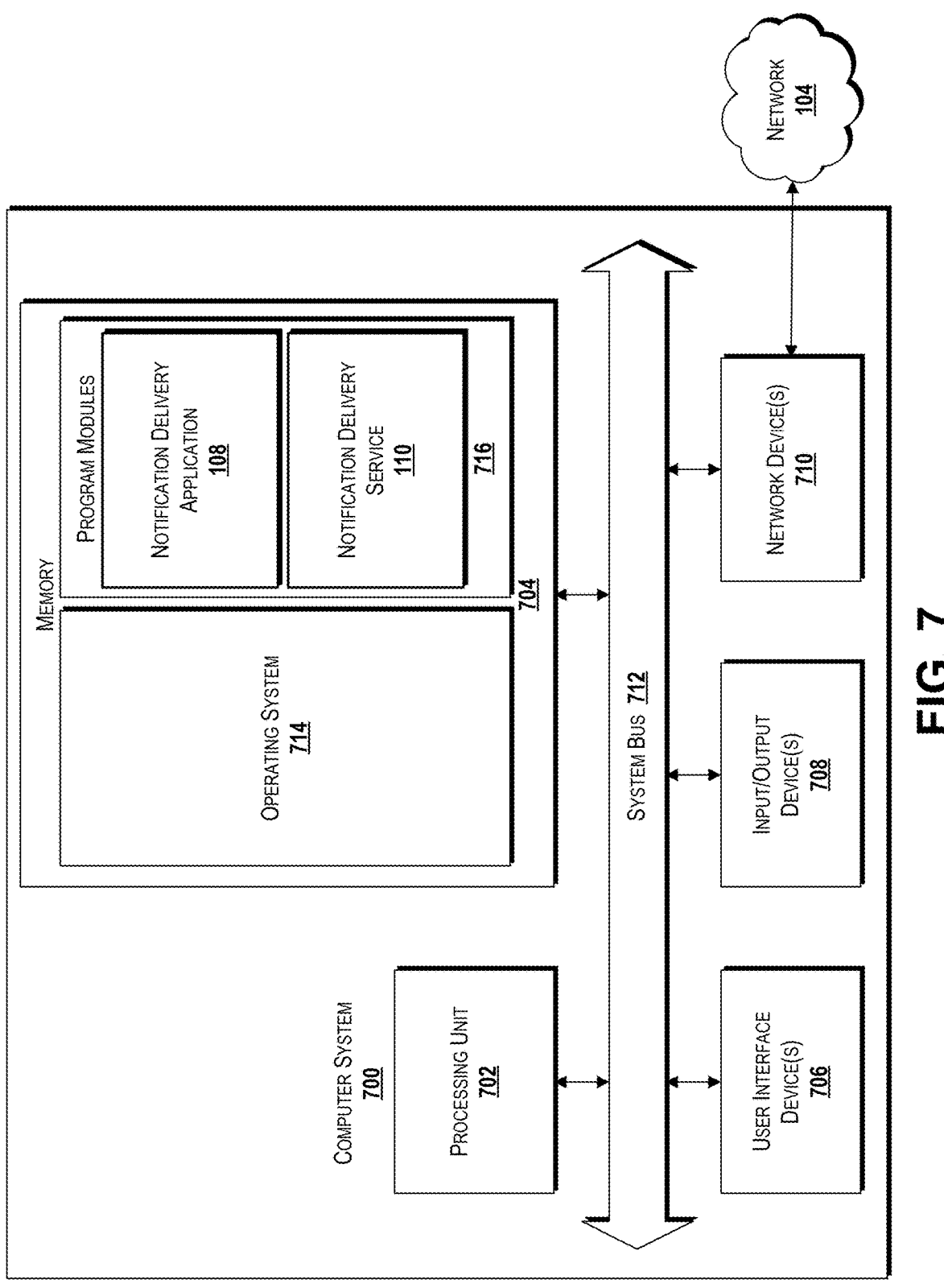

FIG. 7 is a block diagram illustrating an example computer system configured to provide a notification delivery service, according to some illustrative embodiments of the concepts and technologies described herein.

Figure 8:
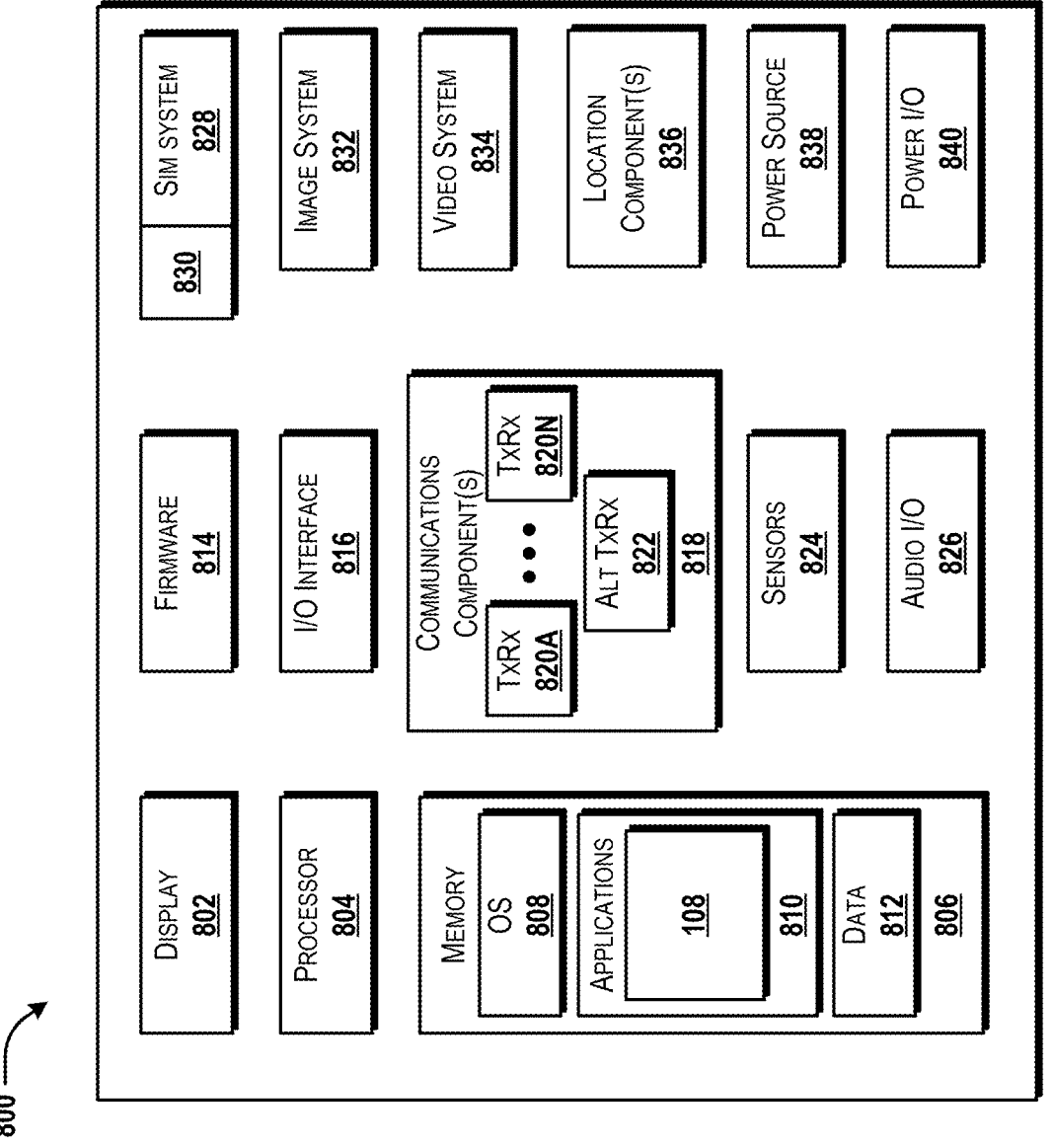

FIG. 8 is a block diagram illustrating an example mobile device configured to interact with a notification delivery service, according to some illustrative embodiments of the concepts and technologies described herein.

Figure 9:
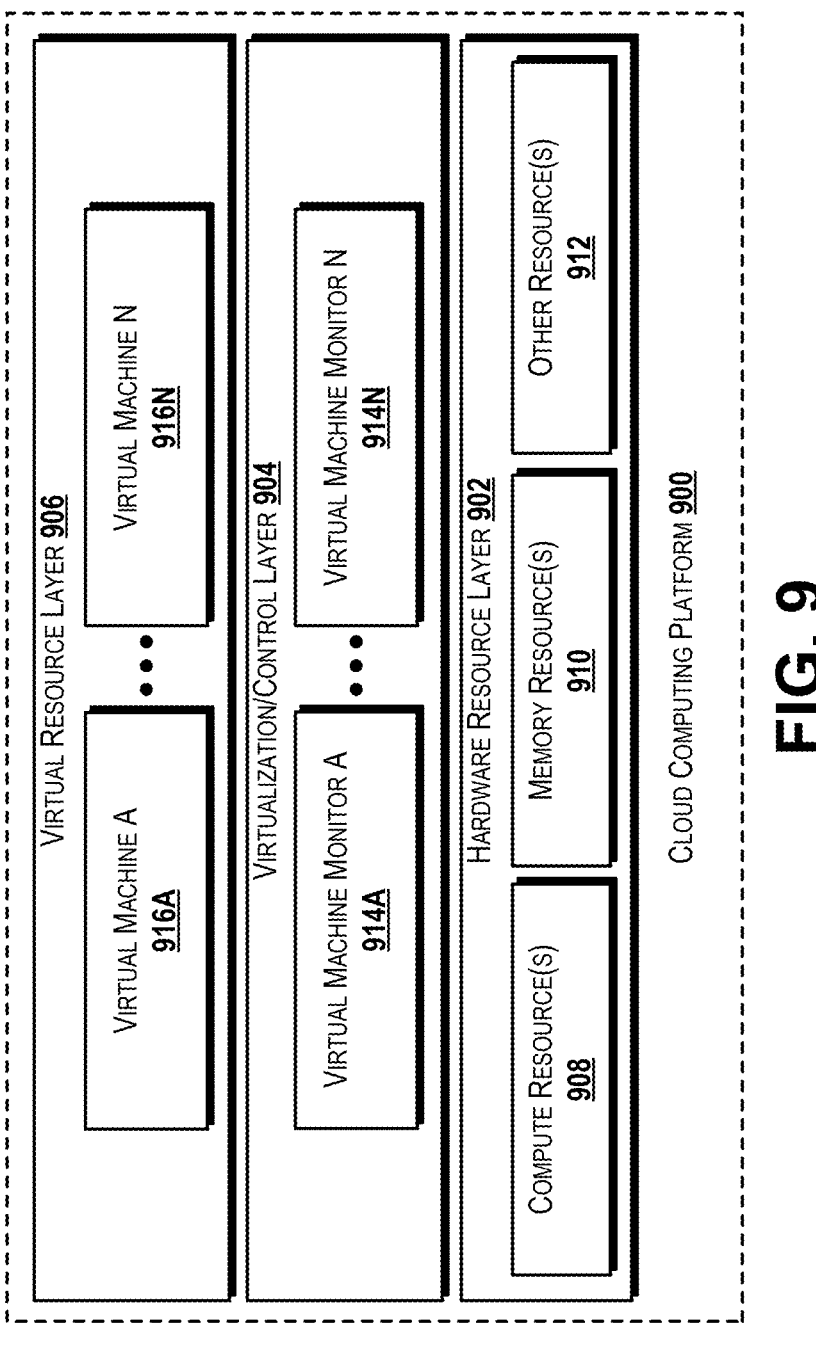

FIG. 9 is a diagram illustrating a computing environment capable of implementing aspects of the concepts and technologies disclosed herein, according to some illustrative embodiments of the concepts and technologies described herein.

DETAILED DESCRIPTION

The following detailed description is directed to a notification delivery service. A user device can register and/or authenticate with the notification delivery service for management of notifications for the user device. The user device can authenticate with and/or access the notification delivery service using a notification delivery application or other applications that may access the notification delivery service via a portal, webpage, API, or the like. The user device and/or other devices collect and provide, to the notification delivery service, model data that can include contextual information associated with the user device and the receipt, thereof, of one or more notifications. The notification delivery service can analyze the model data and generate, based on the model data, a notification model for the user device. The notification model can model delivery of notifications to the user device and behavior of the user device in response to the notifications. In various embodiments, the notification model can include a rule set and/or a framework for optimizing the creation of and delivery of notifications to the user device. The notification delivery service can store the notification model and can update the notification model based on future releases of model data, notification requests, and/or contextual data.

The notification delivery service can receive a notification request that can request a notification for delivery to the user device. The notification request can include a device list of notification devices to which notifications can be sent (instead of or in addition to the user device). The notification also can include preferences for notifications such as, for example, sounds, grouping of notifications, visual effects, haptic outputs, and the like for notifications, timing of delivery of notifications, location preferences, and the like. In some other embodiments, the user device can communicate the preferences to the notification delivery service at other times such as during setup and/or registration. Regardless, the preferences can be stored as part of the notification model in some embodiments. Based on the notification request and the notification model, the notification delivery service can determine notifications that may be generated for the user device. In some embodiments, the notification delivery service also can obtain, from the user device and/or other devices, contextual data for potential use in modifying the notifications.

In particular, the contextual data can include location data, sound level data, activity data, and other data associated with the user device. The location data can define a geographic location of the user device and/or proximity of the user device to other devices such as the notification devices. The sound level data can define ambient sound levels at the user device, frequencies of noise at the user device, and/or other sound information that may affect the ability of a user to hear the notifications if provided audibly. The activity data can define activity of the user device and/or a user associated with the user device. Thus, the contextual data can define a state and location of the user device.

Based on the contextual data and the notification model, the notification delivery service can determine if any of the notifications should be modified in terms of mode of delivery (e.g., audible, visual, haptic, summarization, detail expansion, etc.), time of delivery (e.g., immediately, delayed, repeated, replicated, etc.), recipients of the notifications (e.g., the user device and/or one or more notification devices), and the like. If no modifications are to be made, the notifications may be delivered without changes. If changes are to be made, the notification delivery service can modify the notifications and/or the delivery thereof and deliver (or trigger delivery of) the notifications to the user device and/or one or more notification devices. The notification delivery service also can update the notification models based on the notification delivery. Thus, the notification delivery service can maximize the effectiveness of notifications intended for the user device, according to some embodiments.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
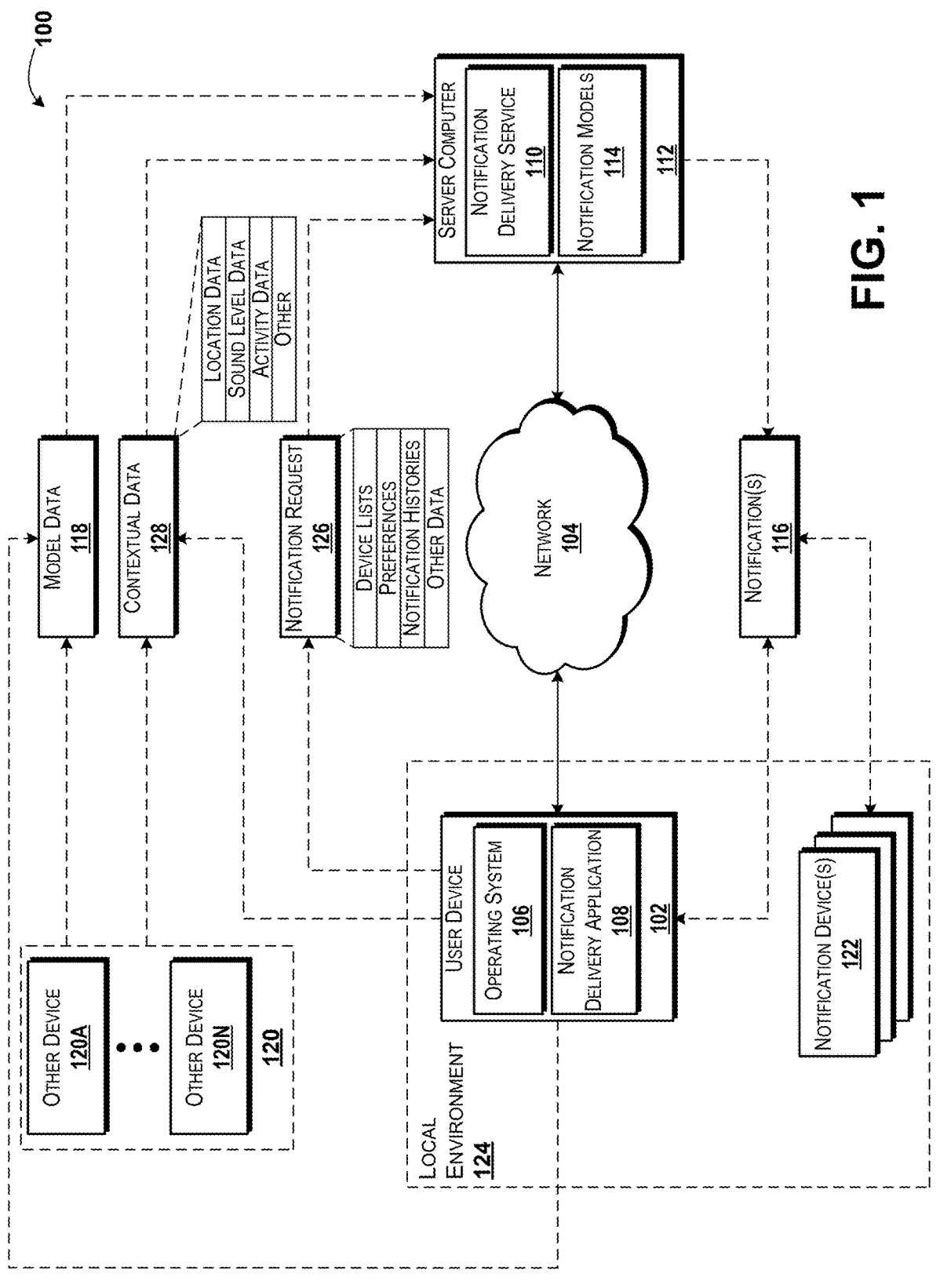
FIG. 1 is a system diagram illustrating an illustrative operating environment for various embodiments of the concepts and technologies described herein.

Referring now to FIG. 1, aspects of an operating environment 100 for various embodiments of the concepts and technologies disclosed herein for notification delivery service will be described, according to an illustrative embodiment. The operating environment 100 shown in FIG. 1 includes a user device 102. The user device 102 can operate in communication with and/or as part of a communications network ("network") 104, though this is not necessarily the case in all embodiments of the concepts and technologies disclosed herein.

According to various embodiments, the functionality of the user device 102 may be provided by one or more server computers, desktop computers, smartwatches, smartphones, mobile telephones, laptop computers, customer premises equipment, other computing systems, and the like. It should be understood that the functionality of the user device 102 may be provided by a single device, by two or more similar devices, and/or by two or more dissimilar devices. For purposes of describing the concepts and technologies disclosed herein, the user device 102 is described herein as a smartphone. It should be understood that this embodiment is illustrative, and should not be construed as being limiting in any way.

The user device 102 can execute an operating system 106 and one or more application programs such as, for example, a notification delivery application 108. The operating system 106 can include a computer program that can control the operation of the user device 102. The notification delivery application 108 can include an executable program that can be configured to execute on top of the operating system 106 to provide various functions as illustrated and described herein. The functionality of the notification delivery application 108 will be described in additional detail after introducing other components of the operating environment 100.

As shown in FIG. 1, the user device 102 (e.g., via execution of the notification delivery application 108) can be configured to communicate with a notification delivery service 110, which can be hosted and/or executed by a computing device or resource such as, for example, a server computer 112. The functionality of the notification delivery service 110 will be described in more detail after introducing other entities in the operating environment 100. According to various embodiments of the concepts and technologies disclosed herein, the functionality of the server computer 112 may be provided by one or more server computers, application servers, web servers, other computing systems, and the like. It should be understood that the functionality of the server computer 112 may be provided by a single device, by two or more similar devices, and/or by two or more dissimilar devices. For purposes of describing the concepts and technologies disclosed herein, the server computer 112 is described herein as an application server. It should be understood that this embodiment is illustrative, and should not be construed as being limiting in any way.

The server computer 112 (e.g., via execution of the notification delivery service 110 or the like) also can create, store, and/or access (e.g., at an external data storage device, data storage resource, server, or the like) one or more notification models 114. As used herein, each of the notification models 114 can include data, rules, and/or instructions that can define how one or more notifications 116 are and/or should be provided to a particular user or entity such as the user device 102 and/or devices in communication with the user device 102 as illustrated and described herein. Each of the notification models 114 can be generated by the notification delivery service 110 based on model data 118, which can be obtained from the user device 102 and/or one or more other devices 120A-N (hereinafter collectively and/or generically referred to as "other devices 120"). Additional details of the notification delivery service 110, the notification models 114, the notifications 116, the model data 118, and the other devices 120 will be illustrated and described in more detail after introducing other elements of the operating environment 100.

As shown in FIG. 1, the operating environment 100 also can include one or more notification devices 122. The notification devices 122 can include one or more devices that can be located in a local environment 124 associated with the user device 102. According to various embodiments of the concepts and technologies disclosed herein, the local environment 124 can correspond to a local network (e.g., a WiFi network, one or more Bluetooth connections with the user device 102, and the like), a proximity of the user device 102, and/or other area around, near, and/or associated with the user device 102 at a particular time (e.g., an automobile media system can function as a notification device 122 when the user device 102 is travelling in the automobile, or the like). Thus, the local environment can correspond to a home, an office, a business, an automobile, a building, or the like, and therefore can correspond to an area in a communication range with the user device 102 and/or a router, gateway, customer premises equipment ("CPE"), or the like that establishes a local network. As used herein, the "communication range" of the user device 102 and/or the router, gateway, CPE, or the like can correspond to a communication range of a WiFi, Bluetooth, or similar short-range transceiver of the respective devices. It should be understood that this example embodiment is illustrative, and therefore should not be construed as being limiting in any way.

According to various embodiments of the concepts and technologies disclosed herein, the notification devices 122 can include any devices that can communicate directly and/or indirectly with the user device 102 and/or the server computer 112. The notification devices 122 can be configured to send notifications 116 to the user device 102 and/or to output notifications 116 (e.g., from the notification delivery service 110). The notifications 116 illustrated and described herein can be output at the user device 102 and/or at the notification devices 122 as or with sounds; visual output such as lights, text, or the like; haptic output; combinations thereof; or the like. According to various embodiments of the concepts and technologies disclosed herein, the notification devices 122 can include, but are not limited to, wireless speakers (e.g., Bluetooth speakers), smartphones, smartwatches, computers, automobiles, home alarm systems, Internet-of-things devices, Internet-enabled devices of various types, other devices, combinations thereof, or the like. Because the notification devices 122 can include additional and/or alternative devices that can provide notifications 116 to the user device 102, it should be understood that these examples of notification devices 122 are illustrative, and therefore should not be construed as being limiting in any way. Now that the elements of the operating environment 100 have been briefly disclosed, the functionality of the notification delivery application 108 and notification delivery service 110 will be described in detail.

The notification delivery application 108 can be configured to manage the delivery of (and/or the configuring of delivery of) one or more of the notifications 116, one or more summary of two or more notifications 116, one or more groups of notifications 116, or the like, to the user device 102 and/or one or more notification devices 122. In some embodiments, as shown in FIG. 1, the notification devices 122 can be configured to output the notifications 116 (or group or summary thereof) as supplementary to delivery of the notifications 116 to the user device 102 (e.g., a notification 116 can be output by the user device 102 and one or more of the notification devices 122), instead of being delivered to the user device 102 (e.g., the notification 116 can be delivered to the notification devices 122 instead of the user device 102), and/or if the user device 102 does not act on the notification(s) 116 in a determined time. Because the notifications 116 can be delivered to one or more of the notification devices 122 and/or the user device 102 based on various considerations as illustrated and described herein, it should be understood that these examples are illustrative, and therefore should not be construed as being limiting in any way.

The notification delivery application 108 can be configured to perform various operations in association with creation of the notification models 114 and/or requesting and/or configuring the delivery of notifications 116 to the user device 102 and/or the notification devices 122. According to various embodiments, the notification delivery application 108 can be configured to generate model data 118. The notification delivery application 108 can track activity of the user device 102 and generate the model data 118, with the model data 118 capturing and/or representing activity of the user device 102 for which notifications 116 have been received, movements of the user device 102 during activities for which notifications 116 have been configured and/or received, and/or other activity of the user device 102 that relates to the generation of, providing of, receipt of, and/or acting on one or more notifications 116.

Thus, the notification delivery application 108 can be configured to identify when a notification 116 has been configured or received by the user device 102 and context of that notification 116 such as where the user device 102 was when the notification 116 was configured and/or received, an ambient volume in the local environment associated with the user device 102 when the notification 116 was configured and/or received, other devices at or near the user device 102 when the notification 116 was configured and/or received, an amount of time that passes from the notification 116 being provided to the user device 102 and the user device 102 taking some action in response to the notification 116, combinations thereof, or the like. This and other information can be tracked by the user device 102 and used by the notification delivery application 108 to generate the model data 118. The user device 102 can transmit the model data 118 to the notification delivery service 110, and the notification delivery service 110 can use the model data 118 as illustrated and described herein. It should be understood that this example embodiment is illustrative, and therefore should not be construed as being limiting in any way.

According to various embodiments, as shown in FIG. 1, the model data 118 also can be generated by other devices 120, which may provide contextual information relating to the configuring and/or receiving of notifications 116 by the user device 102 in various embodiments. Thus, it can be appreciated that the other devices 120 can correspond to one or more network devices that can monitor electronic and/or real activity of the user device 102 (e.g., one or more network monitors, other devices in communication with the user device 102, one or more devices in the local environment 124 such as a gateways, customer premises equipment, routers, network equipment, or the like (not illustrated in FIG. 1), location beacons, proximity sensors, cameras, other devices, combinations thereof, or the like). The other devices 120 can capture contextual information that represents and/or relates to activity of the user device 102, and can generate the model data 118 based on the monitored activity. It should be understood that this example embodiment is illustrative, and therefore should not be construed as being limiting in any way.

The notification delivery service 110 can be configured to receive or otherwise obtain the model data 118 from the user device 102 and/or the other devices 120. Although not shown in FIG. 1, it can be appreciated that the notification delivery service 110 can be configured to store the model data 118 temporarily and/or permanently at the server computer 112 and/or at a database or other data structure that can be in communication with the server computer 112. Thus, it can be appreciated that the notification delivery service 110 can be configured to collect one or more instances of the model data 118 from the user device 102 and/or the other devices 120 and generate the notification models 114 based on the one or more instances of the model data 118.

In some other embodiments, the notification delivery service 110 can be configured to generate a notification model 114 based on an instance of model data 118 and to update and/or modify the notification model 114 upon a future release or instance of the model data 118. Thus, it should be appreciated that the model data 118 can be keyed on a user device 102 via a device or user identifier such as an international mobile subscriber identity ("IMSI"), an international mobile equipment identity ("IMEI"), a media access control identifier ("MAC ID"), phone number, email address, user name, an Internet protocol ("IP") address, and/or other unique identifiers for the user device 102 and/or a user thereof. It further can be appreciated that a particular user or other entity may be associated with multiple devices including, but not limited to, the user device 102. As such, the use of a user identifier may be preferred in some embodiments in order to associate model data 118 associated with a user across multiple devices with the single user. It should be understood that this example embodiment is illustrative, and therefore should not be construed as being limiting in any way.

The notification delivery service 110 can analyze the model data 118 (and/or multiple instances of model data 118) and determine, based on the model data 118, one or more notifications 116 that should be provided to the user device 102 when particular activities are occurring at and/or relating to the user device 102; locations at which notifications 116 should be sent to the user device 102 and/or surfaced at the user device 102; locations at which notifications 116 should be delayed or cancelled; times at which notifications 116 should be sent to, surfaced at, or delayed from delivery to the user device 102; noise levels at which additional and/or supplemental notifications 116 should be delivered to the user device 102 and/or notification devices 122; other preferences and/or settings associated with the notifications 116 (e.g., sounds, volumes, locations, devices, and/or times of notifications 116 and/or the like); combinations thereof; or the like. These and/or other contours of notifications 116 for and/or relating to the user device 102 can be used by the notification delivery service 110 to generate a notification model 114. The notification model 114 can represent how, when, and/or where notifications 116 are and/or should be provided to the user device 102. It should be understood that this example embodiment is illustrative, and therefore should not be construed as being limiting in any way.

The notification delivery service 110 also can be configured to store the notification models 114. As explained above, the notification models 114 and/or other data illustrated and described herein can be stored at the server computer 112, at an external data storage device or entity, combinations thereof, or the like. The notification delivery service 110 can use the notification models 114 to create one or more notifications 116 and/or to trigger delivery of one or more notifications 116 as illustrated and described herein. Additional details of creating and/or triggering delivery of notifications 116 is illustrated and described in more detail herein.

The notification delivery application 108 also can be configured to create a notification request 126. The notification request 126 can be generated by the user device 102 to request a notification 116 from one or more devices, services, or the like. According to various embodiments of the concepts and technologies disclosed herein, the notification request 126 can include device lists, preferences, notification histories, other data, combinations thereof, or the like. As will be explained in more detail herein, the preferences, device lists, and/or notification histories can be included in the model data 118 and/or otherwise included in the notification models 114 prior to receiving the notification request 126 in various embodiments of the concepts and technologies disclosed herein. Furthermore, the notification request 126 can include additional and/or alternative components and/or data as illustrated and described herein. Thus, the illustrated embodiment is illustrative and should not be construed as being limiting in any way.

The device lists included in the notification request 126 (or optionally otherwise provided to the notification delivery service 110 and/or included in the notification model 114) can include, for example, lists of one or more devices that can be used to deliver and/or generate the notifications 116 being requested by way of the notification request 126. Thus, it can be appreciated that the device lists can include the user device 102, one or more of the notification devices 122, other devices, combinations thereof, or the like. According to various embodiments of the concepts and technologies disclosed herein, the devices in the device list can be identified by a universal identifier such as a MAC ID, an IMEI, a globally unique identifier ("GUID"), other identifiers, combinations thereof, or the like. Because the devices can be identified in additional and/or alternative manners, it should be understood that these example embodiments are illustrative, and therefore should not be construed as being limiting in any way.

The preferences included in the notification request 126 (or optionally otherwise provided to the notification delivery service 110 and/or included in the notification model 114) can include, for example, preferences for the user device 102 regarding what notifications 116 are to be delivered to the user device 102, where such notifications 116 should (or should not) be delivered, times at which the notifications 116 should (or should not) be delivered, activities associated with the user device 102 that, if being completed at a given time, should (or should not) allow delivery of the notifications 116, devices that should (or should not) be allowed to provide notifications 116 to the user device 102 and/or trigger delivery of notifications 116 to the user device 102, combinations thereof, or the like.

The notification histories included in the notification request 126 (or optionally otherwise provided to the notification delivery service 110 and/or included in the notification model 114) can include, for example, information describing notifications 116 created for and/or sent to the user device 102 over time. In some embodiments of the concepts and technologies disclosed herein, the notification histories can be configured to represent a sliding window of time (e.g., a previous one month, three months, six months, one year, or the like time period). A sliding time window may be used in some embodiments based on an assumption that in some embodiments, patterns of notifications 116 and/or types of notifications 116 for a user device 102 or user may change over time (among other behavior relating to the notifications 116 such as actions taken in response thereto, etc.). It should be understood that this example embodiment is illustrative, and therefore should not be construed as being limiting in any way. Thus, it should be understood that the notification histories can represent any time period as set preferences, configurations, and/or settings.

In any event, the notification histories can represent what notifications 116 have been sent in the past to the user device 102, a response time for the notifications 116, movements and/or other activities associated with the user device 102 when notifications 116 are sent and/or received, notification subscriptions, combinations thereof, or the like. Thus, the notification histories can indicate, for the user device 102, how the user device 102 uses and/or responds to notifications 116, as well as location-based information about the user device 102 relative to the notifications 116. It should be understood that this example embodiment is illustrative, and therefore should not be construed as being limiting in any way.

The other data included in the notification request 126 can include, for example, location information associated with the user device 102 (e.g., a current geographic location of the user device 102), an activity being performed at the user device 102, an application being executed by the user device 102, other devices in a proximity of the user device 102, contextual information associated with the user device 102 such as noise levels or the like, combinations thereof, or the like. Because the other data can include other information as illustrated and described herein, it should be understood that these example embodiments are illustrative, and therefore should not be construed as being limiting in any way.

The notification delivery service 110 can receive the notification request 126 and determine that one or more notifications 116 should be delivered to the user device 102 at some time in response to the notification request 126. The notification delivery service 110 can be configured to retrieve the notification model 114 associated with the user device 102 that sent the notification request 126 and determine, based on the notification request 126 and the notification model 114, what notifications 116 may be provided to the user device 102. For example, the notification delivery service 110 can determine what notifications 116 may or may not be delivered to the user device 102 based on activities at and/or associated with the user device 102, locations of the user device 102, activities being performed at the user device 102, other devices near the user device 102, combinations thereof, or the like. Thus, the notification delivery service 110 can determine what notifications 116 are possible in response to the notification request 126. It should be understood that this example embodiment is illustrative, and therefore should not be construed as being limiting in any way.

The notification delivery service 110 can also be configured to prompt the user device 102 for contextual data 128 from the user device 102 and/or the other devices 120 (the request for this contextual data 128 is not explicitly illustrated in FIG. 1). It can be appreciated, however, that the notification delivery service 110 can send a request to the user device 102 and/or the other devices 120 via the same communication channel via which the server computer 112 communicates with the user device 102 and/or the other devices 120. In some other embodiments, the user device 102 and/or the other device 120 can be configured to periodically provide the contextual data 128 to the server computer 112 without any explicit request from the server computer 112 and/notification delivery service 110. As such, it should be understood that the illustrated and described embodiments are illustrative, and therefore should not be construed as being limiting in any way.

The contextual data 128 can provide information about the user device 102 and/or activity associated with the user device 102 for use in modifying notifications 116 and/or modifying the delivery of the notifications 116. In particular, the contextual data 128 can include, for example, location data, sound level data, activity data, and/or other data. In other embodiments, contextual data 128 may be visual or textual content that is captured directly by one of the sensors or synthesized or summarized content (e.g. a textual synopsis of an audio event or a visual illustration that was synthesized for an exemplar alert). In these embodiments some or all of the additional contextual data 128 may be modified from its original form before delivery in a notification 116. Because the contextual data 128 can include additional and/or alternative types of data as illustrated and described herein, it should be understood that these example types of data are illustrative, and therefore should not be construed as being limiting in any way.

The location data can define, among other things, a current geographic location of the user device 102, a proximity of the user device 102 to one or more notification devices 122 co-located in the local environment 124, and/or other absolute and/or relative location or proximity information. The sound level data can include, for example, an ambient noise level at or near the user device 102 and/or in the local environment 124. This sound level data can be used to determine if notifications 116 that include an audio output will be heard by a user and/or otherwise can be used by the notification delivery service 110 to adjust notifications 116. The activity data can identify, for example, an activity being completed or performed at or with the user device 102. The contextual data 128 also can include, for example, data that can identify or define what type of notification 116 is being generated (e.g., routine, non-routine, emergency, or the like) and/or other contextual information as illustrated and described herein.

Thus, the contextual data 128 can be obtained by the notification delivery service 110 to determine if any changes to the notifications 116 should be made. For example, if a noise level at or near the user device 102 may result in the notification 116 being missed by a user or other entity associated with the user device 102. For example, in some embodiments a noise level threshold can be set at anything over sixty decibels (60 dB), seventy-five decibels (75 dB), eighty decibels (80 dB), eighty-five decibels (85 dB), one hundred decibels (100 dB), or the like, and if the contextual data 128 indicates that an ambient noise level exceeds that threshold the notification delivery service 110 may determine that an additional and/or alternative notification 116 is appropriate to avoid the notification 116 being missed. It should be understood that this example embodiment is illustrative, and therefore should not be construed as being limiting in any way.

Based on the analysis of the notification models 114 and the contextual data 128, the notification delivery service 110 can determine if any changes should be made to the default notifications 116 that otherwise would be provided to the user device 102. For example, if the user device 102 is associated with a user who currently is in a meeting, the notification delivery service 110 can delay (or trigger a delay of) the delivery of the notifications 116 until the meeting ends. Additionally, or alternatively, the notification delivery service 110 can deliver the notifications 116 in an alternative manner to avoid interrupting the meeting, while still delivering the notifications 116 such as, for example, sending an email version of the notification 116 (instead of, for example a text message version of the notification 116 and/or a push notification version of the notification 116), displaying text on a notification device 122, outputting a haptic alert or visual alert on the user device 102 and/or the notification devices 122, combinations thereof, or the like. Because many other types of modifications are possible, contemplated, and illustrated and described herein, it should be understood that these examples are illustrative, and therefore should not be construed as being limiting in any way.

In practice, a user device 102 may be registered with the notification delivery service 110 for management of notifications 116 for the user device 102. The registration process for the notification delivery service 110 can be managed, in some embodiments, by a notification delivery application 108, which can be hosted and/or executed by the user device 102. Thus, it can be appreciated that the notification delivery application 108 can be a native application executed on the user device 102 and can access and/or use data hosted and/or provided by the notification delivery service 110. In some other embodiments, the user device 102 can access the notification delivery service 110 via a portal, webpage, API, or the like and need not necessarily execute the notification delivery application 108. As such, it should be understood that this example embodiment is illustrative, and therefore should not be construed as being limiting in any way.

The user device 102 (e.g., via execution of the notification delivery application 108) and/or other devices 120 (e.g., home gateways, network monitors, location beacons, mobility network elements and/or monitors, other devices, combinations thereof, or the like) can be configured to collect and provide, to the notification delivery service 110, model data 118. As explained herein, the model data 118 can include contextual information associated with the user device 102 and the receipt, thereof, of one or more notifications 116. Thus, the model data 118 can include information that describes how, when, and where the user device 102 receives notifications 116 as well as how, what, and where the user device 102 does in response to notifications 116. By way of example, the model data 118 can capture the creation of a notification 116 for delivery to the user device 102; the delivery of the notification 116 to the user device 102 including a location at which the user device 102 is located, ambient noise levels at the user device 102 (e.g., measured using a microphone or other sound sensor at the user device 102) upon receipt of the notification 116, and other devices in proximity to the user device 102 when the notification 116 is received; and details of a response to the notification 116 by the user device 102; combinations thereof; or the like. It should be understood that this example embodiment is illustrative, and therefore should not be construed as being limiting in any way.

The notification delivery service 110 can analyze the model data 118 and generate, based on the model data 118, a notification model 114 for the user device 102. The notification model 114 can model delivery of notifications 116 to the user device 102 and behavior of the user device 102 in response to the notifications 116. Thus, the notification model 114 can include rules set and/or framework for optimizing the creation of and delivery of notifications 116 to the user device 102. The notification delivery service 110 can store the notification model 114 at the server computer 112 and/or elsewhere (e.g., a remote data storage device or resource) for future use. Additionally, the notification delivery service 110 can be configured to update the notification model 114 based on future releases of model data 118, notification requests 126, and/or contextual data 128. It should be understood that this example embodiment is illustrative, and therefore should not be construed as being limiting in any way.

The notification delivery service 110 can receive a notification request 126. The notification request 126 can request a notification 116 for the user device 102. The notification request 126 can include, among other things, a device list of notification devices 122 to which notifications 116 can be sent instead of, or in addition to, the user device 102; preferences for notifications 116 such as, for example, sounds, visual effects, haptic outputs, and the like for notifications 116, timing of delivery of notifications 116, location preferences, and the like; and other data for defining the notifications 116 being requested by the user device 102. Based on the notification request 126 and the notification model 114, the notification delivery service 110 can determine notifications 116 that may be generated for the user device 102. The notification delivery service 110 also can obtain, from the user device 102 and/or other devices 120, contextual data 128.

The contextual data 128 can include location data, sound level data, activity data, and other data. The location data can define a geographic location of the user device 102 and/or proximity of the user device 102 to other devices such as the notification devices 122. The sound level data can define ambient sound levels at the user device 102 (e.g., measured by the user device 102 using a microphone or other sound sensor at the user device 102), frequencies of noise at the user device 102, and/or other sound information that may affect the ability of a user to hear the notifications 116 if provided audibly. The activity data can define activity of the user device 102 and/or a user associated with the user device 102. Thus, the contextual data 128 can define a state and location of the user device 102. It should be understood that this example embodiment is illustrative, and therefore should not be construed as being limiting in any way.

Based on the contextual data 128 and the notification model 114, the notification delivery service 110 can determine if any of the notifications 116 should be modified in terms of mode of delivery (e.g., audible, visual, haptic, etc.), time of delivery (e.g., immediately, delayed, repeated, replicated, etc.), recipients of the notifications 116 (e.g., the user device 102 and/or one or more notification devices 122), and the like. If no modifications are to be made, the notifications 116 may be delivered without changes. If changes are to be made, the notification delivery service 110 can modify the notifications 116 and/or the delivery thereof and deliver or trigger delivery of the notifications 116 to the user device 102 and one or more notification devices 122. The notification delivery service 110 also can update the notification models 114 based on the delivery of the notification 116. Thus, the notification delivery service 110 can maximize the effectiveness of notifications 116 intended for the user device 102. It should be understood that this example embodiment is illustrative, and therefore should not be construed as being limiting in any way.

While the above description of FIG. 1 has discussed repeating notifications 116, forwarding notifications 116, delaying notifications 116, and the like, it should be understood that some embodiments of the concepts and technologies disclosed herein also can include other actions for the notifications 116. In particular, various embodiments of the concepts and technologies disclosed herein can include emergency contact information for notifications 116, and can forward notifications 116 to those emergency contacts if a user device 102 does not receive and/or act on a notification 116. Thus, for example, a person living alone could have an emergency contact listed, and if a notification 116 is not received and/or acted on the notification delivery service 110 can forward the notifications 116 to the emergency contact. As such, it should be understood that the recipients of the notifications 116 can include devices and/or users designated by the user of the user device 102 and/or other users (e.g., emergency contacts, emergency services, etc.) according to various embodiments of the concepts and technologies disclosed herein. Additionally, as noted above, the concepts and technologies disclosed herein can support generating groupings of notifications 116, summaries of notifications 116, or other representations and/or groups of notifications 116 (e.g., instead of delivering multiple notifications 116). It should be understood that this example embodiment is illustrative, and therefore should not be construed as being limiting in any way.

FIG. 1 illustrates one user device 102, one network 104, one server computer 112, two other devices 120, three notification devices 122, and one local environment 124. It should be understood, however, that various implementations of the operating environment 100 can include one or more than one user device 102; one or more than one network 104; zero, one, or more than one server computer 112; zero, one, two, or more than two other devices 120; zero, one, two, three, or more than three notification devices 122; and one or more than one local environment 124. As such, the illustrated embodiment should be understood as being illustrative, and should not be construed as being limiting in any way.

Figure 2:
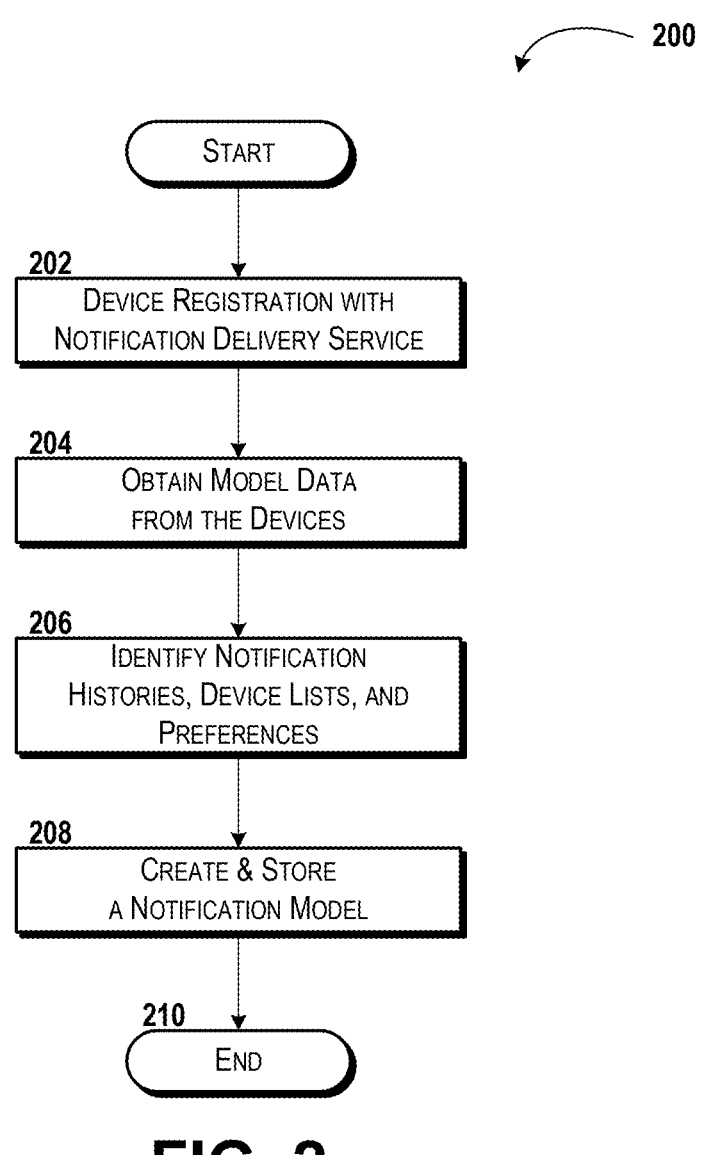
FIG. 2 is a flow diagram showing aspects of a method for creating a notification model, according to an illustrative embodiment of the concepts and technologies described herein.

Turning now to FIG. 2, aspects of a method 200 for creating a notification model 114 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102 and/or the server computer 112, to perform one or more operations and/or causing the processor to direct other components of the computing system or device to perform one or more of the operations.

For purposes of illustrating and describing the concepts of the present disclosure, the method 200 is described herein as being performed by the server computer 112 via execution of one or more software modules such as, for example, the notification delivery service 110. It should be understood that additional and/or alternative devices and/or network nodes can provide the functionality described herein via execution of one or more modules, applications, and/or other software including, but not limited to, the notification delivery service 110. Thus, the illustrated embodiments are illustrative, and should not be viewed as being limiting in any way.

The method 200 begins at operation 202. At operation 202, the server computer 112 can detect device registration with the notification delivery service 110. According to various embodiments of the concepts and technologies disclosed herein, the user device 102 can sign up for the notification delivery service 110 and/or otherwise be registered for use of the notification delivery service 110. According to various embodiments of the concepts and technologies disclosed herein, the user device 102 can register for the notification delivery service 110 by way of authenticating with the notification delivery service 110 and/or otherwise activating or signing up for the notification delivery service 110. Because registering for and/or activating a service with a device such as the user device 102 is generally understood, additional details are not described herein.

From operation 202, the method 200 can proceed to operation 204. At operation 204, the server computer 112 can obtain model data 118 from one or more devices such as, for example, the user device 102 and/or one or more other devices 120. As explained above, the model data 118 can define how a user device 102 is used, how notifications 116 are delivered to the user device 102, how the user or other entity generates and/or responds to notifications 116, environmental and/or contextual information associated with the user device 102 (e.g., sound levels at the user device 102 and/or in the local environment 124, usage of the user device 102, location of the user device 102, proximity of the user device 102 to other devices such as the notification devices 122 and/or the other devices 120, activities of the user device 102, combinations thereof, or the like). Because additional and/or other information can be included in the model data 118 as illustrated and described herein, it should be understood that these examples are illustrative, and therefore should not be construed as being limiting in any way.

As explained above, the model data 118 can be obtained from the user device 102 and/or one or more other devices 120. Furthermore, the model data 118 can be obtained in a single release of data and/or data file and/or over several releases of data and/or data files. Thus, it can be appreciated that obtaining the model data 118 can include receiving multiple instances of model data 118 in some embodiments. It should be understood that this example embodiment is illustrative, and therefore should not be construed as being limiting in any way.

From operation 204, the method 200 can proceed to operation 206. At operation 206, the server computer 112 can determine notification histories, device lists, preferences, and the like associated with the user device 102. According to various embodiments of the concepts and technologies disclosed herein, the server computer 112 can determine these and/or other aspects of notifications 116 by analyzing the model data 118. Thus, it can be appreciated that the server computer 112 can determine, in operation 204, when notifications 116 should be generated for the user device 102, what kind of notifications 116 should be generated for the user device 102, what modifications to the notifications 116 should be made (e.g., in terms of format, delivery (e.g., to what device, the timing of delivery, duplication of delivery, delay of delivery, forwarding of delivery, cancelling of delivery, etc.), mode of delivery (e.g., sound, visual, haptic, or the like), histories of notifications 116 and expected interaction and/or responses to the notifications 116 by the user device 102, contextual information relating to the user device 102, combinations thereof, or the like). These and other information from the model data 118 can be used by the server computer 112 to generate a notification model 114, which can correspond to a framework of rules and/or preferences relating to the delivery of notifications 116 for the user device 102. It should be understood that this example embodiment is illustrative, and therefore should not be construed as being limiting in any way.

From operation 206, the method 200 can proceed to operation 208. At operation 208, the server computer 112 can create and store a notification model 114 for the user device 102. Based on the above description of operation 210, it can be appreciated that the server computer 112 can generate a framework and/or rule set for defining the delivery of notifications 116 to the user device 102. The notification model 114 can therefore define rules and/or a framework for how the notifications 116 should be sent to the user device 102 such as a format of the notifications 116, delivery of the notifications 116 (e.g., to what device the notifications 116 should be delivered, the timing of delivery of the notifications 116 to the user device 102, duplication of delivery of the notifications 116 to the user device 102 and/or notification devices 122, lists of devices that can receive the notifications 116 instead of and/or in addition to the user device 102, delays that may be applied to delivery of the notifications 116, forwarding that may be applied to delivery of the notifications 116, cancelling of delivery of the notifications 116, mode of delivery of the notifications 116 such as, for example, whether the notifications 116 are provided as audible notifications 116, visual notifications 116, haptic notifications 116, histories of notifications 116 and expected interactions with and/or responses to the notifications 116 by the user device 102, contextual information relating to the user device 102, combinations thereof, or the like). Thus, the notification model 114 generated in operation 208 can define how, when, where, and if notifications 116 should be delivered to the user device 102. It should be understood that this example embodiment is illustrative, and therefore should not be construed as being limiting in any way.

From operation 208, the method 200 can proceed to operation 210. The method 200 can end at operation 210.

Figure 3:
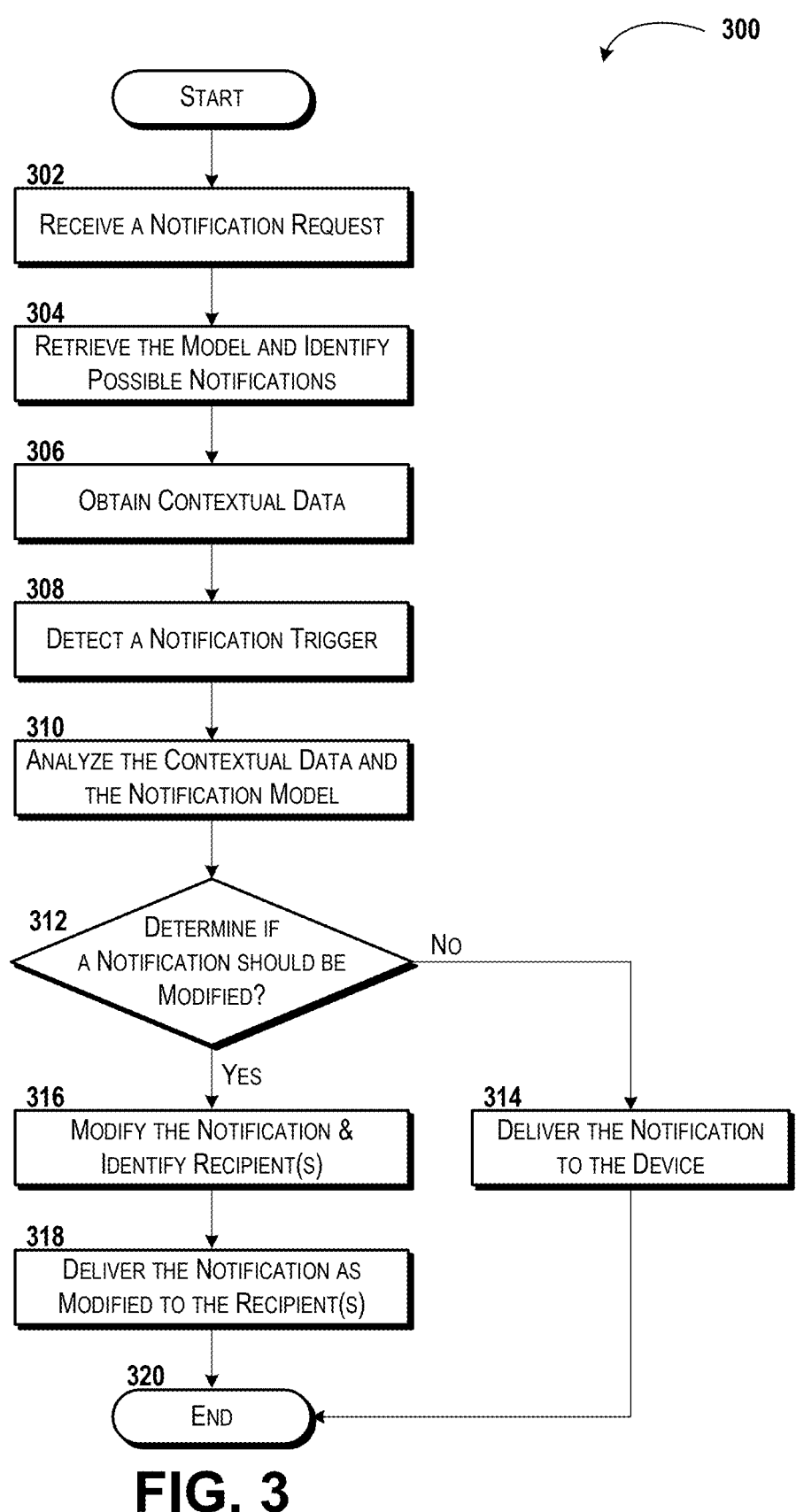
FIG. 3 is a flow diagram showing aspects of a method for delivering a notification using a notification delivery service, according to an illustrative embodiment of the concepts and technologies described herein.

Turning now to FIG. 3, aspects of a method 300 for delivering a notification 116 using a notification delivery service 110 will be described in detail, according to an illustrative embodiment. For purposes of illustrating and describing the concepts of the present disclosure, the method 300 is described herein as being performed by the server computer 112 via execution of one or more software modules such as, for example, the notification delivery service 110. It should be understood that additional and/or alternative devices and/or network nodes can provide the functionality described herein via execution of one or more modules, applications, and/or other software including, but not limited to, the notification delivery service 110. Thus, the illustrated embodiments are illustrative, and should not be viewed as being limiting in any way.

The method 300 begins at operation 302. At operation 302, the server computer 112 can receive a notification request 126 from (or associated with) the user device 102. As explained above, the notification request 126 can correspond to a request by the user device 102 for the notification delivery service 110 to configure delivery of notifications 116 that are intended for delivery to the user device 102. The notification request 126 can include a device listing (e.g., devices to which notifications 116 can be delivered and/or not delivered), one or more preferences controlling various aspects of the notification delivery service 110, notification histories, and/or other data. It can be appreciated that the device listings, notification histories, preferences, and/or other data also can be sent from the user device 102 to the notification delivery service 110 at other times and not necessarily part of the notification request 126 as illustrated in FIG. 1. As such, it should be understood that the illustrated embodiment is illustrative and should not be construed as being limiting in any way.

From operation 302, the method 300 can proceed to operation 304. At operation 304, the server computer 112 can retrieve the notification model 114 associated with the user device 102. Based on the notification model 114 and the notification request 126, the server computer 112 can identify one or more possible notifications 116. Thus, in operation 304, the server computer 112 can identify one or more notifications 116 that may be delivered to the user device 102 based on the notification request 126, the notification model 114, and/or other information. This determination, however, may not consider the context of the user device 102 at the current time as illustrated and described herein. Thus, operation 304 can correspond to the server computer 112 determining the notifications 116 that may be delivered to the user device 102. In some embodiments, operation 304 can be replaced or supplemented by an operation for determining that a notification 116 should be delivered to the user device 102 (and performing the subsequent operations for determining context of the user device 102 and delivering the modified notifications 116). As such, it should be understood that the illustrated embodiment is illustrative, and therefore should not be construed as being limiting in any way.

From operation 304, the method 300 can proceed to operation 306. At operation 306, the server computer 112 can obtain contextual data 128 from the user device 102 and/or one or more other devices 120. In various embodiments of the concepts and technologies disclosed herein, the server computer 112 can be configured to request the contextual data 128 from the user device 102 in operation 306 and receive the contextual data 128 from the user device 102 and/or other devices 120 in operation 306. In some other embodiments, the user device 102 and the other devices 120 can be configured to provide the contextual data 128 to the notification delivery service 110 at various times such as periodically, on request, on demand, and/or at other times. Thus, operation 306 can correspond to the server computer 112 receiving the contextual data 128 at any time from various devices. It should be understood that this example embodiment is illustrative, and therefore should not be construed as being limiting in any way.

From operation 306, the method 300 can proceed to operation 308. At operation 308, the server computer 112 can detect a notification trigger (e.g., can determine that a notification 116 should be delivered to the user device 102). As noted above, operation 308 can be performed in some embodiments of the method 300 before operation 306. In any event, the server computer 112 can determine that a notification 116 should be delivered to the user device 102 in operation 308.

From operation 308, the method 300 can proceed to operation 310. At operation 310, the server computer 112 can analyze the contextual data 128 and the notification model 114. Thus, in operation 310, the server computer 112 can determine the context of the user device 102 (e.g., what the user device 102 is doing, where the user device 102 is located, what notifications 116 may be provided to the user device 102 under these circumstances, ambient sound levels at or near the user device 102, how the user device 102 may be expected to respond to the notifications 116, combinations thereof, or the like).

From operation 310, the method 300 can proceed to operation 312. At operation 312, the server computer 112 can determine if a notification 116 should be modified based on the analysis of operation 310. Thus, in operation 312, the server computer 112 can determine if any changes should be made to the default notifications 116 that otherwise would be delivered to the user device 102. For example, if the contextual data 128 indicates that an ambient noise level is very loud (e.g., an ambient noise level over eighty-five decibels or other defined thresholds), the server computer 112 can determine that the notifications 116 should be modified to attempt to maximize the likelihood that the user device 102 will receive and/or notice the notification 116. For example, the server computer 112 may determine that multiple notifications 116 should be sent to the user device 102 and/or other devices such as one or more notification devices 122, that multiple notifications 116 should be repeated at the user device 102, that multiple notifications 116 should be summarized and provided as a summary, that multiple notifications 116 should be grouped and provided as a group, that visual, haptic, and audio notifications 116 should be sent to the user device 102, combinations thereof, or the like. Because many other modifications of the notifications 116 have been illustrated and described herein, it should be understood that the above examples are merely illustrative of the concepts and technologies disclosed herein and therefore should not be construed as being limiting in any way.

If the server computer determines, in operation 312, that one or more of the notifications 116 should not be modified, the method 300 can proceed to operation 314. At operation 314, the server computer 112 can deliver the notification 116 to the user device 102 (without the server computer 112 making any modifications to the notifications 116). Because other actions can be performed at operation 314, it should be understood that this example embodiment is illustrative, and therefore should not be construed as being limiting in any way.

If the server computer 112 determines, in operation 312, that one or more of the notifications 116 should be modified, the method 300 can proceed to operation 316. At operation 316, the server computer 112 can modify the one or more notifications 116 and identify one or more recipients of the notifications 116. As noted above, the server computer 112 can determine to what device(s) the notifications 116 should be delivered (e.g., the user device 102 and/or one or more notification devices 122), the timing of delivery of the notifications 116 to the user device 102, duplication of delivery of the notifications 116 to the user device 102 and/or notification devices 122, summarization of and/or delivery of a summary of notifications 116 to the user device 102 and/or notification devices 122, grouping of and/or delivery of a group of notifications 116 to the user device 102 and/or notification devices 122, lists of devices that can receive the notifications 116 instead of and/or in addition to the user device 102, delays that may be applied to delivery of the notifications 116, forwarding that may be applied to delivery of the notifications 116, cancelling of delivery of the notifications 116, mode of delivery of the notifications such as, for example, whether the notifications 116 are provided as audible notifications 116, visual notifications 116, haptic notifications 116, histories of notifications 116 and expected interactions with and/or responses to the notifications 116 by the user device 102, contextual information relating to the user device 102, combinations thereof, or the like. The server computer 112 can modify the notifications 116 (e.g., from a default delivery scheme to that of the determined delivery scheme). It can be appreciated that in some embodiments of operation 316, multiple notifications 116 can be output by the server computer 112 and/or notifications 116 may be cancelled. It should be understood that this example embodiment is illustrative, and therefore should not be construed as being limiting in any way.

From operation 316, the method 300 can proceed to operation 318. At operation 318, the server computer 112 can deliver the zero, one, or more than one notification 116 to the one or more recipients as determined in operation 316. It can be appreciated that operation 318 can correspond to the server computer 112 sending the notifications 116 to the user device 102 and/or the notification devices 122, the server computer 112 triggering delivery (by other devices) to the user device 102 and/or one or more notification devices 122, and/or the server computer 112 otherwise effecting delivery of the notifications 116 to the user device 102. It should be understood that this example embodiment is illustrative, and therefore should not be construed as being limiting in any way.

In various embodiments of the concepts and technologies disclosed herein, it should be understood that the method 300 can be performed without determining the notifications 116 prior to obtaining the contextual data 128. Namely, some embodiments of the method 300 can include receiving a notification request 126; obtaining contextual data 128; determining, based on the notification model 114, the notification request 126, and the contextual data 128, what notifications 116 are to be delivered to the user device 102 and/or notification devices 122; and delivering or triggering delivery of the notifications 116 to the user device 102 and/or one or more notification devices 122. As such, it should be understood that the illustrated embodiment is illustrative and should not be construed as being limiting in any way.

From operation 318, the method 300 can proceed to operation 320. The method 300 also can proceed to operation 320 from operation 314. The method 300 can end at operation 320.

Figure 4:
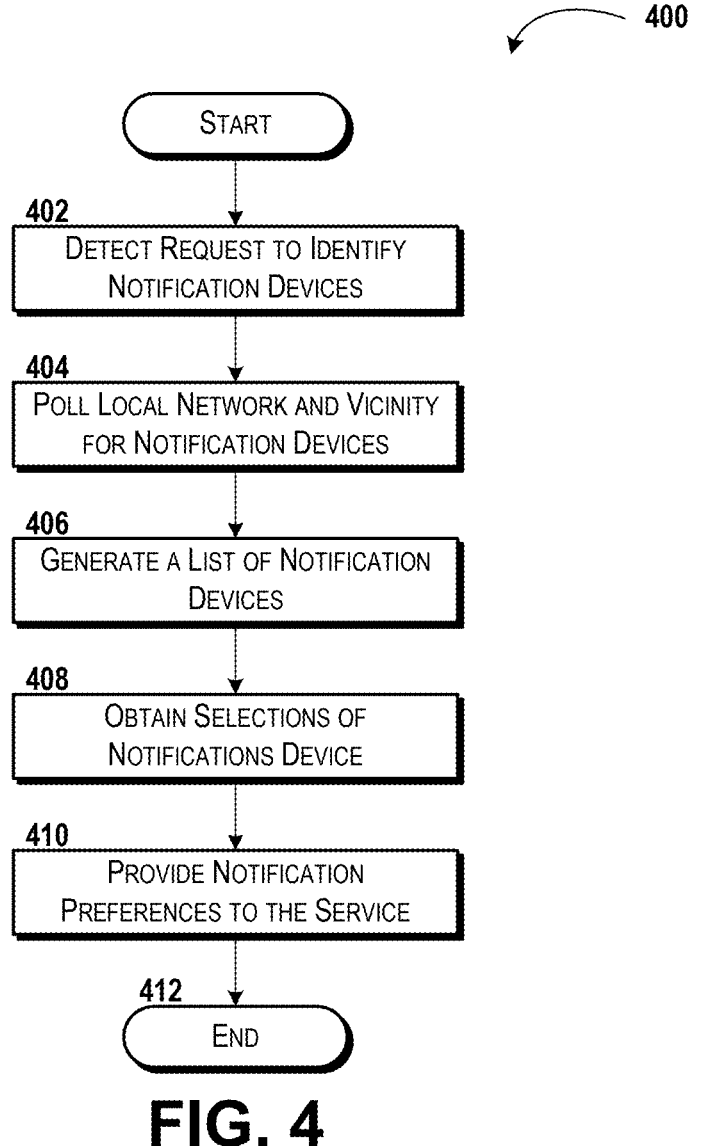

Turning now to FIG. 4, aspects of a method 400 for identifying and designating notification devices 122 using a notification delivery service 110 will be described in detail, according to an illustrative embodiment. For purposes of illustrating and describing the concepts of the present disclosure, the method 400 is described herein as being performed by the user device 102 via execution of one or more software modules such as, for example, the notification delivery application 108. It should be understood that additional and/or alternative devices and/or network nodes can provide the functionality described herein via execution of one or more modules, applications, and/or other software including, but not limited to, the notification delivery application 108. Thus, the illustrated embodiments are illustrative, and should not be viewed as being limiting in any way.

The method 400 begins at operation 402. At operation 402, the user device 102 can detect a request to identify one or more notification devices 122. According to various embodiments of the concepts and technologies disclosed herein, the request detected in operation 402 can correspond to a request (e.g., from the notification delivery service 110) to provide contextual data 128, a request at the user device 102 (e.g., selection of an option to discover devices in proximity to and/or communication with the user device 102), and/or other operations for finding notification devices 122 in the local environment 124. Regardless of how and/or from where the request is received in operation 402, the user device 102 can determine that notification devices 122 should be discovered. It should be understood that this example embodiment is illustrative, and therefore should not be construed as being limiting in any way.

From operation 402, the method 400 can proceed to operation 404. At operation 404, the user device 102 can discover one or more notification devices 122. As explained herein, the user device 102 can be configured to communicate with local network devices (e.g., a home gateway, a router, or the like) to identify devices connected to the network devices; to perform a WiFi survey of the area (e.g., to activate a WiFi transceiver of the user device 102 and detect WiFi-enabled devices in proximity to the user device 102); to perform a Bluetooth survey of the area (e.g., to activate a Bluetooth transceiver of the user device 102 and detect Bluetooth-enabled devices in proximity to the user device 102); to receive, e.g., via text entry or the like, a list of devices; and/or to otherwise identity notification devices 122. Because the notification devices 122 can be identified in additional and/or alternative manners, it should be understood that these example embodiments of operation 404 are illustrative, and therefore should not be construed as being limiting in any way.

From operation 404, the method 400 can proceed to operation 406. At operation 406, the user device 102 can generate a list of notification devices 122. It can be appreciated that the list of notification devices 122 generated in operation 406 can be generated by populating the list with the devices identified in operation 404. It should be understood that this example embodiment is illustrative, and therefore should not be construed as being limiting in any way.

From operation 406, the method 400 can proceed to operation 408. At operation 408, the user device 102 can obtain a selection of one or more of the notification devices 122 discovered in operation 404. Operation 408 can correspond to the user device 102 receiving input and/or selections (e.g., through interactions with the user device 102 via a touch interface and/or using other input devices). Example user interfaces for presenting the list of notification devices 122 and obtaining selections of the notification devices 122 are illustrated and described below with reference to FIGS. 5A and 5B. It should be understood that this example embodiment is illustrative, and therefore should not be construed as being limiting in any way.

From operation 408, the method 400 can proceed to operation 410. At operation 410, the user device 102 can provide notification preferences to the notification delivery service 110 (e.g., as part of the notification request 126, the contextual data 128, and/or other data). The server computer 112 can use the preferences to modify the notification model 114 and/or to modify one or more notifications 116 as illustrated and described herein. It should be understood that this example embodiment is illustrative, and therefore should not be construed as being limiting in any way.

From operation 410, the method 400 can proceed to operation 412. The method 400 can end at operation 412.

FIGS. 5A-5B are user interface ("UI") diagrams showing aspects of UIs for using and/or interacting with the notification delivery service 110 and/or the notification delivery application 108, according to some illustrative embodiments of the concepts and technologies disclosed herein. FIG. 5A shows an illustrative screen display 500A. According to some embodiments of the concepts and technologies described herein, the screen display 500A can be generated by a device such as the user device 102 via interactions with the notification delivery application 108 and/or the notification delivery service 110. In particular, according to various embodiments, the user device 102 can generate the screen display 500A and/or other screen displays in conjunction with and/or based upon interactions with the notification delivery application 108 described herein, which can be configured to render the screen display 500A using data generated at the user device 102 and/or using data provided by the notification delivery service 110. It should be appreciated that the UI diagram illustrated in FIG. 5A is illustrative of one contemplated example of the UIs that can be generated and/or displayed in accordance with the concepts and technologies disclosed herein, and therefore should not be construed as being limited in any way.

According to various embodiments, the screen display 500A can be presented, for example, when a user device 102 detects a request to identify one or more notification devices 122 (e.g., as illustrated and described above with reference to operation 402 of the method 400 shown in FIG. 4). Because the screen display 500A illustrated in FIG. 5A can be displayed at additional and/or alternative times, it should be understood that these examples are illustrative and therefore should not be construed as being limiting in any way.

The screen display 500A can include various menus and/or menu options (not shown in FIG. 5A). The screen display 500A also can include a notification device designation window 502. The notification device designation window 502 can be configured to present a selectable list of notification devices 122 that are located in proximity to the user device 102 and/or on a local network and/or otherwise in a local environment 124 of the user device 102. In particular, the notification device designation window 502 can include prompt 504. The prompt 504 can provide context for the notification device designation window 502. Namely, the prompt 504 can indicate that a user can select one or more of the notification devices 122 identified in the notification device designation window 502 for providing duplicate and/or modified notifications 116 as illustrated and described herein. It should be understood that this example is illustrative and therefore should not be construed as being limiting in any way.

As shown in FIG. 5A, the notification device designation window 502 can include one or more selectable notification device identifiers 506A-D (hereinafter collectively and/or generically referred to as "selectable notification device identifiers 506"). One or more of the selectable notification device identifiers 506 can relate to a notification device 122 that is located in the local environment 124 and/or otherwise in proximity to the user device 102. In the illustrated embodiment of the screen display 500A, the selectable notification device identifiers 506 can be selected (e.g., by tapping a check box, the selectable notification device identifiers 506 themselves, and/or the like) or deselected to designate (or de-designate) the associated notification device 122 for receiving duplicate and/or modified notifications 116. In the illustrated embodiment, the user or other entity has selected selectable notification device identifiers 506A, 506C, and 506D, respectfully corresponding to "Bluetooth speakers," a "home alarm system," and "Cindy's cell phone." Thus, in the illustrated embodiment, the user or other entity has selected to allow notifications 116 to be sent to these devices in addition to or instead of the user device 102. Similarly, the user or other entity has not selected selectable notification device identifier 506B to allow notifications 116 to be sent to the "refrigerator display". It should be understood that this example embodiment is illustrative, and therefore should not be construed as being limiting in any way.

The notification device designation window 502 also can include a UI control 508 to search for more devices, e.g., to search for more notification devices 122 in the local environment 124 of the user device 102. Selection of the UI control 508 can cause the user device 102 to search its proximity to find other devices that can provide the functionality of the notification devices 122 as illustrated and described herein. Thus, it can be appreciated that selection of the UI control 508 can cause the user device 102 to connect to a gateway or other network device to identify other devices in the local environment 124, to connect to the server computer 112 to identify other devices in the local environment 124, and/or otherwise to identify other notification devices 122. It should be understood that this example embodiment is illustrative, and therefore should not be construed as being limiting in any way.

The notification device designation window 502 also can include a UI control 510 to exit from the notification device designation window 502. Thus, for example, the user or other entity can select the UI control 510 to cause the user device 102 to close the notification device designation window 502 when the desired information has been obtained via the notification device designation window 502, when the user or other entity wishes to close the notification device designation window 502 for other reasons, and/or at other times at which the UI control 510 is selected. Because additional or alternative controls can be included in the notification device designation window 502, it should be understood that the example embodiment shown in FIG. 5A is illustrative and therefore should not be construed as being limiting in any way.

FIG. 5B shows an illustrative screen display 500B. According to some embodiments of the concepts and technologies described herein, the screen display 500B can be generated by a device such as the user device 102 via interactions with the notification delivery application 108 and/or the notification delivery service 110. In particular, according to various embodiments, the user device 102 can generate the screen display 500B and/or other screen displays in conjunction with and/or based upon interactions with the notification delivery application 108 described herein, which can be configured to render the screen display 500B using data generated at the user device 102 and/or using data provided by the notification delivery service 110. It should be appreciated that the UI diagram illustrated in FIG. 5B is illustrative of one contemplated example of the UIs that can be generated and/or displayed in accordance with the concepts and technologies disclosed herein, and therefore should not be construed as being limited in any way.

According to various embodiments, the screen display 500B can be presented, for example, when a user device 102 detects a request to identify one or more notification devices 122 (e.g., as illustrated and described above with reference to operation 402 of the method 400 shown in FIG. 4 and/or via selection of the UI element 508 in FIG. 5A). Because the screen display 500B illustrated in FIG. 5B can be displayed at additional and/or alternative times, it should be understood that these examples are illustrative and therefore should not be construed as being limiting in any way.

The screen display 500B can include various menus and/or menu options (not shown in FIG. 5B). The screen display 500B also can include a notification delivery service preferences window 512. The notification delivery service preferences window 512 can be configured to enable configuration of various preferences associated with the notification delivery service 110. Of course, the illustrated example preferences are illustrative of some possible preferences and other preferences are possible and are contemplated. As such, the illustrated screen display 500B is illustrative and should not be construed as being limiting in any way.

As shown in FIG. 5B, the notification delivery service preferences window 512 can include various preferences that can have associated preference selectors 514A-G (hereinafter collectively and/or generically referred to as "preference selectors 514"). It can be appreciated that the preference selectors 514 can enable or disable a corresponding preference. In the illustrated embodiment, for example, the preference selector 514A can enable or disable an option to forward, duplicate, delay, and/or cancel notifications 116 (e.g., to another device such as one of the notification devices 122 or other device) if an ambient sound level exceeds a defined threshold as illustrated and described herein. In the illustrated embodiment, a user or other entity can adjust the threshold by way of a UI option 516 for adjusting the threshold level. Furthermore, a user or other entity can select between forwarding the notifications 116, duplicating the notifications 116, delaying delivery of the notifications 116, and/or taking other actions based on ambient noise levels by way of interacting with a UI option 518 that can be interacted with to select forwarding, duplicating, delaying, cancelling, or otherwise modifying the notifications 116. In the illustrated embodiment, the threshold is set at seventy-five decibels (75 dB) and the option to forward the notifications 116 has been selected. It should be understood that this example embodiment is illustrative, and therefore should not be construed as being limiting in any way.

The preference selector 514B can enable or disable another option to forward, duplicate, delay, and/or cancel notifications 116 (e.g., to another device such as one of the notification devices 122 or other device) if an ambient sound level exceeds a defined threshold as illustrated and described herein. Thus, it can be appreciated that a user other or entity can set one or more actions at different sound level thresholds, as shown in FIG. 5B. Namely, in the illustrated embodiment, a user or other entity can adjust the threshold by way of a UI option 520 for adjusting the threshold level. Furthermore, a user or other entity can select between forwarding the notifications 116, duplicating the notifications 116, delaying delivery of the notifications 116, and/or taking other actions based on ambient noise levels by way of interacting with a UI option 522 that can be interacted with to select forwarding, duplicating, delaying, cancelling, or otherwise modifying the notifications 116. In the illustrated embodiment, the threshold is set at eighty-five decibels (85 dB) and the option to delay the notifications 116 has been selected. Thus, in the embodiment shown in FIG. 5B, the notifications 116 can be forwarded to other notification devices 122 if an ambient noise level exceeds seventy-five decibels and the delivery of the notifications 116 can be delayed if the ambient noise level exceeds eight-five decibels. It should be understood that this example embodiment is illustrative, and therefore should not be construed as being limiting in any way.

The preference selector 514C can enable or disable an option to pause (or delay) delivery notifications 116 if a calendar associated with the user device 102 and/or the user thereof indicates that the user is currently in a meeting. Thus, it can be appreciated that a user or other entity can interrupt the delivery of notifications 116 via the notification delivery service 110 in various embodiments of the concepts and technologies disclosed herein instead of relying on silencing the user device 102 directly and/or otherwise modifying hardware or software settings associated with the user device 102. In the illustrated embodiment, the option to pause notifications based on the calendar has been disabled. It should be understood that this example embodiment is illustrative, and therefore should not be construed as being limiting in any way.

The preference selector 514D can enable or disable an option to pause (or delay) delivery notifications 116 if the user device 102 leaves a location. Although not explicitly shown in FIG. 5B, the word location can be configured as a link or selectable option via which the user or other entity associated with the user device 102 can select the defined location or area via various interfaces. Thus, it can be appreciated that a user or other entity can interrupt the delivery of notifications 116 via the notification delivery service 110 in various embodiments of the concepts and technologies disclosed herein instead of relying on silencing the user device 102 directly and/or otherwise modifying hardware or software settings associated with the user device 102, and that such delay can be based on the calendar events, location, and/or other considerations. In the illustrated embodiment, the option to pause notifications 116 based on the location of the user device 102 has been disabled. It should be understood that this example embodiment is illustrative, and therefore should not be construed as being limiting in any way.

The preference selector 514E can enable or disable an option to provide emergency notifications 116 (e.g., through a do not disturb mode or the like) based on settings of the notification delivery service 110. Thus, it can be appreciated that a user or other entity can allow the delivery of notifications 116 via the notification delivery service 110 in various embodiments of the concepts and technologies disclosed herein notwithstanding the silencing of the user device 102 or other do not disturb settings, or the like. Although not specifically shown in FIG. 5B, it should be understood that various UIs can be presented for a user or other entity to define various emergency conditions such as, for example, detecting a crying child, detecting a fire alarm or burglar alarm, receiving an emergency message from a contact, combinations thereof, or the like. In the illustrated embodiment, the option to allow emergency notifications 116 has been enabled. It should be understood that this example embodiment is illustrative, and therefore should not be construed as being limiting in any way.

The preference selector 514F can enable or disable an option to repeat the delivery of the notifications 116 (e.g., to the user device 102 and/or to one or more notification devices 122) until a response is received from the user device 102. Thus, it can be appreciated that a user other entity can cause a repeat delivery of notifications 116 via the notification delivery service 110 until and unless an action on the notification 116 is detected at the user device 102. Although not specifically shown in FIG. 5B, it should be understood that various UIs can be presented for a user or other entity to define what actions may be required for various types of notifications 116. In the illustrated embodiment, the option to repeat the notifications 116 until a response is received has been enabled. It should be understood that this example embodiment is illustrative, and therefore should not be construed as being limiting in any way.

The preference selector 514G can enable or disable an option to generate a summary of multiple notifications 116 that are generated simultaneously (or within a defined number of seconds of each other such as sixty seconds, ten seconds, five seconds, one second, or the like) for the user device 102 and/or to one or more notification devices 122. Although not visible in FIG. 5B, another option can be provided for grouping multiple notifications 116 that are generated simultaneously (or within a defined number of seconds of each other such as sixty seconds, ten seconds, five seconds, one second, or the like) for the user device 102 and/or to one or more notification devices 122. Thus, it can be appreciated that a user other entity can be used to reduce or avoid repeated delivery of notifications 116 via the notification delivery service 110. It should be understood that this example embodiment is illustrative, and therefore should not be construed as being limiting in any way.

The notification delivery service preferences window 512 also can include a UI control 524 to access additional and/or alternative options for the notifications 116 (e.g., an option to group notifications 116, or the like). The notification delivery service preferences window 512 also can include a UI control 526 to apply the preferences as configured via the notification delivery service preferences window 512. Selection of the UI control 526 can cause the user device 102 to send the preferences to the notification delivery service 110 (e.g., as part of the notification request 126 and/or other data). The notification delivery service preferences window 512 also can include a UI control 528 to exit from the notification delivery service preferences window 512. Thus, for example, the user or other entity can select the UI control 528 to cause the user device 102 to close the notification delivery service preferences window 512 when the desired information has been obtained via the notification delivery service preferences window 512, when the user or other entity wishes to close the notification delivery service preferences window 512 for other reasons, and/or at other times at which the UI control 528 is selected. Because additional or alternative controls can be included in the notification delivery service preferences window 512, it should be understood that the example embodiment shown in FIG. 5B is illustrative and therefore should not be construed as being limiting in any way.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), NodeB's or eNodeB's ("eNBs"), gNodeBs ("gNBs"), or the like; base station controllers ("BSCs") radio network controllers ("RNCs"), or the like; an evolved packet core ("EPC"); mobile switching centers ("MSCs" or "MSSs"); session management functions ("SMFs"); mobile management entities ("MMEs"); access and mobility management functions ("AMFs"); authentication server functions ("AUSFs"), network slice selection functions ("NSSFs); network exposure functions ("NEFs"); policy control functions ("PCFs"); and various other functions in the user and control planes such as, for example, user plane functions ("UPFs), application functions ("AFs"), NF repository functions ("NRFs"), and the like; short message service centers ("SMSCs"); multimedia messaging service centers ("MMSCs"); home location registers ("HLRs"); home subscriber servers ("HSSs"); visitor location registers ("VLRs"); charging platforms; billing platforms; voicemail platforms; GPRS core network components; links to data networks ("DNs") and/or other operator services, third party services, and/or the Internet; location service nodes, an IP Multimedia Subsystem ("IMS"); and the like. Of course, the cellular network 602 also can include various interfaces between various components, as is generally understood. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards, 5G mobile communications standards, 6G mobile communication standards, other mobile communications standards, and evolved and future mobile communications standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network

604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

FIG. 7 is a block diagram illustrating a computer system 700 configured to provide the functionality described herein for a notification delivery service, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The system bus 712 can enable bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or SONOMA families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the notification delivery application 108 and/or the notification delivery service 110. These and/or other programs can be embodied in computer-readable media containing instructions that, when executed by the processing unit 702, perform one or more of the methods 200, 300, and 400 described in detail above with respect to FIGS. 2-4 and/or other functionality as illustrated and described herein. It can be appreciated that, at least by virtue of the instructions embodying the methods 200, 300, 400, and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store the notification models 114, the notifications 116, the model data 118, the notification request 126, the contextual data 128, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Turning now to FIG. 8, an illustrative mobile device 800 and components thereof will be described. In some embodiments, the user device 102 described above with reference to FIGS. 1-7 can be configured as and/or can have an architecture similar or identical to the mobile device 800 described herein in FIG. 8. It should be understood, however, that the user device 102 may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements such as, for example, device lists, notifications, notification preferences, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the notification delivery application 108 and/or the notification delivery service 110, other computer-executable instructions stored in a memory 806, or the like. In some embodiments, the applications 810 also can include a UI application (not illustrated in FIG. 8).

The UI application can interface with the operating system 808, such as the operating system 106 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, viewing notifications 116, controlling preferences associated with notifications 116 and/or delivery of the notifications 116, configuring settings, manipulating address book content and/or settings, multi-mode interaction, interacting with other applications 810, and otherwise facilitating user interaction with the operating system 808, the applications 810, and/or other types or instances of data 812 that can be stored at the mobile device 800. The data 812 can include, for example, the notification delivery application 108, the notification delivery service 110, and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804.

It can be appreciated that, at least by virtue of storage of the instructions corresponding to the applications 810 and/or other instructions embodying other functionality illustrated and described herein in the memory 806, and/or by virtue of the instructions corresponding to the applications 810 and/or other instructions embodying other functionality illustrated and described herein being accessed and/or executed by the processor 804, the mobile device 800 is a special-purpose mobile device that can facilitate providing the functionality illustrated and described herein. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, notifications, preferences, contextual information, devices lists, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, 5G, 6G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

FIG. 9 illustrates an illustrative architecture for a cloud computing platform 900 that can be capable of executing the software components described herein for providing a notification delivery application 108 and/or a notification delivery service 110 and/or for interacting with the notification delivery service 110. Thus, it can be appreciated that in some embodiments of the concepts and technologies disclosed herein, the cloud computing platform 900 illustrated in FIG. 9 can be used to provide the functionality described herein with respect to the user device 102, the server computer 112, the other devices 120, the notification devices 122, and/or other devices.

The cloud computing platform 900 thus may be utilized to execute any aspects of the software components presented herein. Thus, according to various embodiments of the concepts and technologies disclosed herein, the notification delivery application 108 and/or a notification delivery service 110 can be implemented, at least in part, on or by elements included in the cloud computing platform 900 illustrated and described herein. Those skilled in the art will appreciate that the illustrated cloud computing platform 900 is a simplification of but only one possible implementation of an illustrative cloud computing platform, and as such, the illustrated cloud computing platform 900 should not be construed as being limiting in any way.

In the illustrated embodiment, the cloud computing platform 900 can include a hardware resource layer 902, a virtualization/control layer 904, and a virtual resource layer 906. These layers and/or other layers can be configured to cooperate with each other and/or other elements of a cloud computing platform 900 to perform operations as will be described in detail herein. While connections are shown between some of the components illustrated in FIG. 9, it should be understood that some, none, or all of the components illustrated in FIG. 9 can be configured to interact with one another to carry out various functions described herein. In some embodiments, the components are arranged so as to communicate via one or more networks such as, for example, the network 104 illustrated and described hereinabove (not shown in FIG. 9). Thus, it should be understood that FIG. 9 and the following description are intended to provide a general understanding of a suitable environment in which various aspects of embodiments can be implemented, and should not be construed as being limiting in any way.

The hardware resource layer 902 can provide hardware resources. In the illustrated embodiment, the hardware resources can include one or more compute resources 908, one or more memory resources 910, and one or more other resources 912. The compute resource(s) 908 can include one or more hardware components that can perform computations to process data, and/or to execute computer-executable instructions of one or more application programs, operating systems, services, and/or other software including, but not limited to, the notification delivery application 108 and/or the notification delivery service 110 illustrated and described herein.

According to various embodiments, the compute resources 908 can include one or more central processing units ("CPUs"). The CPUs can be configured with one or more processing cores. In some embodiments, the compute resources 908 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 908 can include one or more discrete GPUs. In some other embodiments, the compute resources 908 can include one or more CPU and/or GPU components that can be configured in accordance with a co-processing CPU/GPU computing model. Thus, it can be appreciated that in some embodiments of the compute resources 908, a sequential part of an application can execute on a CPU and a computationally-intensive part of the application can be accelerated by the GPU. It should be understood that this example is illustrative, and therefore should not be construed as being limiting in any way.

In some embodiments, the compute resources 908 also can include one or more system on a chip ("SoC") components. It should be understood that an SoC component can operate in association with one or more other components as illustrated and described herein, for example, one or more of the memory resources 910 and/or one or more of the other resources 912. In some embodiments in which an SoC component is included, the compute resources 908 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 908 can be or can include one or more hardware components arranged in accordance with an ARM architecture, available for license from ARM HOLDINGS of Cambridge, United Kingdom. Alternatively, the compute resources 908 can be or can include one or more hardware components arranged in accordance with an x86 architecture, such as an architecture available from INTEL CORPORATION of Mountain View, California, and others. Those skilled in the art will appreciate the implementation of the compute resources 908 can utilize various computation architectures and/or processing architectures. As such, the various example embodiments of the compute resources 908 as mentioned hereinabove should not be construed as being limiting in any way. Rather, implementations of embodiments of the concepts and technologies disclosed herein can be implemented using compute resources 908 having any of the particular computation architecture and/or combination of computation architectures mentioned herein as well as other architectures.

Although not separately illustrated in FIG. 9, it should be understood that the compute resources 908 illustrated and described herein can host and/or execute various services, applications, portals, and/or other functionality illustrated and described herein. Thus, the compute resources 908 can host and/or can execute the notification delivery application 108 and/or a notification delivery service 110 or other applications or services illustrated and described herein.

The memory resource(s) 910 can include one or more hardware components that can perform or provide storage operations, including temporary and/or permanent storage operations. In some embodiments, the memory resource(s) 910 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 908, subject to the definition of "computer storage media" provided above (e.g., as excluding waves and signals per se and/or communication media as defined in this application).

Although not illustrated in FIG. 9, it should be understood that the memory resources 910 can host or store the various data illustrated and described herein including, but not limited to, the notification models 114, the notifications 116, the model data 118, the notification requests 126, the contextual data 128, and/or other data, if desired. It should be understood that this example is illustrative, and therefore should not be construed as being limiting in any way.

The other resource(s) 912 can include any other hardware resources that can be utilized by the compute resources(s) 908 and/or the memory resource(s) 910 to perform operations. The other resource(s) 912 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 902 can be virtualized by one or more virtual machine monitors ("VMMs") 914A-914N (also known as "hypervisors;" hereinafter "VMMs 914"). The VMMs 914 can operate within the virtualization/control layer 904 to manage one or more virtual resources that can reside in the virtual resource layer 906. The VMMs 914 can be or can include software, firmware, and/or hardware that alone or in combination with other software, firmware, and/or hardware, can manage one or more virtual resources operating within the virtual resource layer 906.

The virtual resources operating within the virtual resource layer 906 can include abstractions of at least a portion of the compute resources 908, the memory resources 910, the other resources 912, or any combination thereof. These abstractions are referred to herein as virtual machines ("VMs"). In the illustrated embodiment, the virtual resource layer 906 includes VMs 916A-916N (hereinafter "VMs 916").

Based on the foregoing, it should be appreciated that systems and methods for proving and/or using a notification delivery service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, when executed by the processor, cause the processor to perform operations comprising
    receiving, by a notification delivery service and from a user device, a notification request that requests delivery of a notification,
    retrieving, by the notification delivery service, a notification model for the user device, the notification model comprising a ruleset and framework for delivering notifications to the user device, wherein the notification model comprises preferences associated with the user device and a notification history associated with the user device,
    obtaining, by the notification delivery service and from the user device, contextual data defining a location of the user device, an activity of the user device, and an ambient sound level measured at the user device,
    determining, by the notification delivery service and based on the notification model, the notification request, and the contextual data, a recipient to which the notification is to be delivered and a time at which the notification is to be delivered to the recipient, and
    triggering, by the notification delivery service, delivery of the notification to the recipient.

2. The system of claim 1, wherein the recipient comprises the user device and a notification device located at a local environment in which the user device is located.

3. The system of claim 2, wherein the preferences comprise a device list, wherein the device list identifies notification devices to which the notifications can be provided for the user device, and wherein the notification devices comprise the notification device located at the local environment.

4. The system of claim 3, wherein the device list comprises the notification devices and is obtained from the user device, wherein the user device creates the device list at the user device by detecting, using a WiFi transceiver and a Bluetooth transceiver, the notification devices, presenting selectable representations of the notification devices in a user interface presented at the user device, and generating the device list comprising selected notification devices.

5. The system of claim 1, wherein the computer-executable instructions, when executed by the processor, cause the processor to perform operations further comprising:
    detecting registration of the user device with the notification delivery service, wherein registration comprises authenticating with the notification delivery service and requesting management of the notifications for the user device by the notification delivery service;
    obtaining, from the user device, model data comprising the notification history associated with the user device, activity associated with the user device, and the preferences of the user device for the notifications that are intended for the user device; and
    creating the notification model and storing the notification model at a data storage location accessible by the notification delivery service.

6. The system of claim 1, wherein the contextual data is obtained from the user device and other devices comprising a network monitor associated with a mobility network with which the user device communicates, and a location monitor that monitors locations of the user device.

7. The system of claim 1, wherein determining the time at which the notification is to be delivered to the recipient comprises determining, based on the ambient sound level at the user device, that the ambient sound level exceeds a defined sound level threshold and determining that delivery of the notification is to be delayed until the ambient sound level does not exceed the defined sound level threshold.

8. A method comprising:
    receiving, by a computer executing a notification delivery service and from a user device, a notification request that requests delivery of a notification;
    retrieving, by the notification delivery service, a notification model for the user device, the notification model comprising a ruleset and framework for delivering notifications to the user device, wherein the notification model comprises preferences associated with the user device and a notification history associated with the user device;
    obtaining, by the notification delivery service and from the user device, contextual data defining a location of the user device, an activity of the user device, and an ambient sound level measured at the user device;
    determining, by the notification delivery service and based on the notification model, the notification request, and the contextual data, a recipient to which the notification is to be delivered and a time at which the notification is to be delivered to the recipient; and
    triggering, by the notification delivery service, delivery of the notification to the recipient.

9. The method of claim 8, wherein the recipient comprises the user device and a notification device located at a local environment in which the user device is located.

10. The method of claim 9, wherein the preferences comprise a device list, wherein the device list identifies notification devices to which the notifications can be provided for the user device, and wherein the notification devices comprise the notification device located at the local environment.

11. The method of claim 10, wherein the device list comprises the notification devices and is obtained from the user device, wherein the user device creates the device list at the user device by detecting, using a WiFi transceiver and a Bluetooth transceiver, the notification devices, presenting selectable representations of the notification devices in a user interface presented at the user device, and generating the device list comprising selected notification devices.

12. The method of claim 8, further comprising:

detecting registration of the user device with the notification delivery service, wherein registration comprises authenticating with the notification delivery service and requesting management of the notifications for the user device by the notification delivery service;

obtaining, from the user device, model data comprising the notification history associated with the user device, activity associated with the user device, and the preferences of the user device for the notifications that are intended for the user device; and creating the notification model and storing the notification model at a data storage location accessible by the notification delivery service.

13. The method of claim 8, wherein determining the time at which the notification is to be delivered to the recipient comprises determining, based on the ambient sound level at the user device, that the ambient sound level exceeds a defined sound level threshold and determining that delivery of the notification is to be delayed until the ambient sound level does not exceed the defined sound level threshold.

14. A computer storage medium having computer-executable instructions stored thereon that, when executed by a processor, cause the processor to perform operations comprising:

receiving, by a notification delivery service and from a user device, a notification request that requests delivery of a notification;

retrieving, by the notification delivery service, a notification model for the user device, the notification model comprising a ruleset and framework for delivering notifications to the user device, wherein the notification model comprises preferences associated with the user device and a notification history associated with the user device;

obtaining, by the notification delivery service and from the user device, contextual data defining a location of the user device, an activity of the user device, and an ambient sound level measured at the user device;

determining, by the notification delivery service and based on the notification model, the notification request, and the contextual data, a recipient to which the notification is to be delivered and a time at which the notification is to be delivered to the recipient; and triggering, by the notification delivery service, delivery of the notification to the recipient.

15. The computer storage medium of claim 14, wherein the recipient comprises the user device and a notification device located at a local environment in which the user device is located.

16. The computer storage medium of claim 15, wherein the preferences comprise a device list, wherein the device list identifies notification devices to which the notifications can be provided for the user device, and wherein the notification devices comprise the notification device located at the local environment.

17. The computer storage medium of claim 16, wherein the device list comprises the notification devices and is obtained from the user device, wherein the user device creates the device list at the user device by detecting, using a WiFi transceiver and a Bluetooth transceiver, the notification devices, presenting selectable representations of the notification devices in a user interface presented at the user device, and generating the device list comprising selected notification devices.

18. The computer storage medium of claim 14, wherein the computer-executable instructions, when executed by the processor, cause the processor to perform operations further comprising:

detecting registration of the user device with the notification delivery service, wherein registration comprises authenticating with the notification delivery service and requesting management of the notifications for the user device by the notification delivery service;

obtaining, from the user device, model data comprising the notification history associated with the user device, activity associated with the user device, and the preferences of the user device for the notifications that are intended for the user device; and creating the notification model and storing the notification model at a data storage location accessible by the notification delivery service.

19. The computer storage medium of claim 14, wherein the contextual data is obtained from the user device and other devices comprising a network monitor associated with a mobility network with which the user device communicates, and a location monitor that monitors locations of the user device.

20. The computer storage medium of claim 14, wherein determining the time at which the notification is to be delivered to the recipient comprises determining, based on the ambient sound level at the user device, that the ambient sound level exceeds a defined sound level threshold and determining that delivery of the notification is to be delayed until the ambient sound level does not exceed the defined sound level threshold.

* * * * *